United States Patent [19]
Chase et al.

[11] Patent Number: 6,149,318
[45] Date of Patent: *Nov. 21, 2000

[54] LINK-TIME AND RUN-TIME ERROR DETECTION, AND PROGRAM INSTRUMENTATION

[75] Inventors: David R. Chase, Belmont, Mass.; Samuel C. Kendall, 202 Hamilton St., Cambridge, Mass. 02139; Mark Patrick Mitchell, Atherton, Calif.

[73] Assignee: Samuel C. Kendall, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,421

[22] Filed: Apr. 15, 1997

[51] Int. Cl.[7] ................................................ G06F 9/45
[52] U.S. Cl. .................................... 395/704; 395/708
[58] Field of Search ........................... 395/704, 183.13, 395/183.14, 705, 708; 712/23; 714/35, 38

[56] References Cited

U.S. PATENT DOCUMENTS

| | | | |
|---|---|---|---|
| 4,355,391 | 10/1982 | Alsop, IV | 371/37 |
| 5,535,329 | 7/1996 | Hastings | 714/35 |
| 5,581,696 | 12/1996 | Kolawa et al. | 714/38 |
| 5,613,063 | 3/1997 | Eustace et al. | 714/38 |
| 5,737,629 | 4/1998 | Zuraski, Jr. et al. | 712/23 |
| 5,822,589 | 10/1998 | Diamant et al. | 717/4 |
| 6,035,426 | 3/2000 | Applegate | 714/54 |

OTHER PUBLICATIONS

Lindholm–Yellin, Verification of class Files, The Java Virtual Machine Specification, Addison–Wesley. Sep. 1996.
"OBJECTSTORE Database for the Web, Objectstore 5.0 with Integrated Support for JAVA", Mar. 27, 1997.
AIX XCOFF File Format, Chapter 1. XCOFF:COFF Extended Object File Format; 1.4.3 Typchk Section; pp. 1–26 & 1–27.
SRC Modula–3 Home Page; pp. 1–2.
"Sharing Between Translation Units in C++ Program Databases", S. Kendall et al; USENIX ASSOCIATION; C++ Technical Conference, 1994.
"The Vesta Repository: A File System Extension for Software Development"; Sheng–Yang Chiu et al.; Jun. 14, 1993; Systems Research Center, CA., vol. 106.
"Bridges: Tools to Extend the Vesta Configuration Management System"; Mark R. Brown et al; Jun. 14, 1993; Systems Research Center, CA. vol. 108.
"Network Objects"; Andrew Birrell et al.; Feb. 28, 1994; Systems Research Center, CA, vol. 115.

(List continued on next page.)

*Primary Examiner*—Tariq R. Hafiz
*Assistant Examiner*—Hoang-Vu Anthony Nguyen-Ba
*Attorney, Agent, or Firm*—Fish & Richardson P.C.

[57] ABSTRACT

A programming language processor performs link-time and run-time error checking of a program written in C, C++, or a combination of both. The link-time error checking diagnoses violations of the C++ One Definition Rule, and its equivalent in C. As the program runs, the run-time error checking examines accesses to computer memory to determine that the addresses accessed contain values of che type expected by the program. To add instrumentation to a C or C++ program, pre-expressions, post-expressions and clone-expressions are used to annotate an abstract syntax tree, the annotated tree is then canonicalized into a more traditional syntax tree before a back-end generates code for the program.

6 Claims, 27 Drawing Sheets

Microfiche Appendix Included
(11 Microfiche, 539 Pages)

OTHER PUBLICATIONS

"Unix Time–Sharing System: Portability of C Programs and the UNIX System"; S.C. Johnson et al., Dec. 5, 1977; pp. 2021–2048.

"American National Standard for Information Systems –Programming Language C"; Feb. 14, 1990; section 3.1.2.6;

"ld –link editor for objects files"; Sun Microsystems' Solaris 2.0: Option "–t". pp. 1–4, 1.

"Type–safe Linkage for C++"; Bjarne Stroustrup AT&T Bell Laboratories; Computing Systems vol. 14, No. 4, Fall 1988; pp. 371–403.

Working Paper for Draft Proposed International Standard for Information Systems –Programming Language C++; Section 3.2 (One Definition Rule).

ObjectCenter, Reference Manual; vol. 2; 1986–1993, CenterLine Software, Inc.

| TYPE | COMPLETE() | INCOMPLETE() | INCOMPLETE IS-PARTIAL |
|---|---|---|---|
| VOID | ERROR | CVOID | FALSE |
| PRIMITIVE ARITHMETIC TYPE | EACH DISTINCT TYPE HAS A UNIQUE HASH CODE CUNSIGNED-CHAR CCHAR, ETC | | FALSE |
| POINTER TO T | COMBINE(C POINTER, INCOMPLETE(T)) | | FALSE |
| REFERENCE TO T | COMBINE(C REFERENCE, INCOMPLETE(T)) | | FALSE |
| ARRAY OF N T | COMBINE(C ARRAY, N, COMPLETE(T)) | COMBINE (C ARRAY,N, IN-COMPLETE(T)) | FALSE |
| ARRAY OF UNKNOWN BOUND OF T | ERROR | COMBINE (C ARRAY, 0, COMPLETE(T)) | TRUE |
| CV FUNCTION OF P RETURNING R | ERROR | COMBINE(C FUNCTION, CCV, INCOMPLETE(R) PARAMETER TYPES(P)) | TRUE IF AND ONLY IF THE PARAMETER TYPES ARE UNSPECIFIED (C LANGUAGE ONLY) |
| POINTER TO MEMBER OF CLASS C OF TYPE T | COMBINE(C POINTER-TO-MEMBER, INCOMPLETE(C) INCOMPLETE(T)) | | FALSE |
| CV T | COMBINE(CCV, COMPLETE(T)) | COMBINE(CCV, COMPLETE(T)) | FALSE |
| CLASS TYPE T | COMBINE NAMEONLYHASH(T) WITH HASHES OF ALL THE SOURCE CHARACTERISTICS OF THE TYPE. THIS INCLUDES THE COMPLETE HASHES OF THE BASE CLASSES AND THE TYPES OF THE NONSTATIC MEMBERS, INCOMPLETE HASHES OF THE TYPES OF THE STATIC MEMBERS AND OF NESTED TYPE MEMBERS. HASHES OF THE MEMBER NAMES AND OF THE ACCESS SPECIFIERS MUSTBE COMBINED WITH THE HASHES OF THE ENUMERATORS. | IF T IS TAGLESS, THEN COMPLETE (T). OTHERWISE, NAMEONLY HASH(T) | FALSE<br><br>FALSE |
| ENUM TYPE T | COMBINE NAMEONLYHASH(T) WITH HASHES OF ALL THE NAMES AND VALUES OF EACH OF THE ENUMERATORS. | IF T IS TAGLESS, THEN COMPLETE (T). OTHERWISE, NAMEONLY HASH(T) | |

FIG. 1

| TYPE | COMPLETE() | INCOMPLETE() | INCOMPLETE IS-PARTIAL |
|---|---|---|---|
| VOID | ERROR | CVOID | FALSE |
| PRIMITIVE INTEGER TYPES SMALLER THAN INT | UNIQUE CODE C SIZE, IS-SIGNED BASED ONLY ON THE SIZE AND SIGNEDNESS OF THE TYPE | | FALSE |
| PRIMITIVE INTEGER TYPES AND ENUM TYPES THE SAME SIZE AS INT OR LARGER | UNIQUE CODE C SIZE, BASED ONLY ON THE SIZE OF THE TYPE | | FALSE |
| FLOATING-POINT TYPES | LIKE COMPUTING THE PRECISE HASH CODE | | FALSE |
| POINTER OR REFERENCE TO T | C POINTER | | FALSE |
| ARRAY OF N T | LIKE COMPUTING THE PRECISE HASH CODE | | FALSE |
| ARRAY OF UNKNOWN BOUND OF T | LIKE COMPUTING THE PRECISE HASH CODE | | TRUE |
| CV FUNCTION OF P RETURNING R | LIKE COMPUTING THE PRECISE HASH CODE | | TRUE IF AND ONLY IF THE PARAMETER TYPES ARE UNSPECIFIED (C LANGUAGE ONLY) |
| POINTER TO MEMBER OF CLASS C OF TYPE T | LIKE COMPUTING THE PRECISE HASH CODE | | FALSE |
| CV T | COMPLETE(T)) | INCOMPLETE(T)) | FALSE |
| CLASS TYPE T | LIKE COMPUTING THE PRECISE HASH CODE, BUT OMIT THE CLASS NAME (THOUGH INCLUDE WHETHER THE CLASS IS A STRUCT OR A UNION), THE STATIC MEMBERS, THE NESTED TYPES, THE NONVIRTUAL FUNCTION MEMBERS, AND THE ACCESS SPECIFIERS. WHEN HASHING THE TYPE OF A BIT-FIELD MEMBER, DISREGARD ITS EXACT TYPE; THE HASH CODE SHOULD BE BASED ONLY ON THE NUMBER OF BITS AND SIGNEDNESS. | IF T IS TAGLESS, THEN COMPLETE (T). OTHERWISE, EITHER C STRUCT OR C UNION DEPENDING ON WHETHER THE TYPE IS A STRUCT OR A UNION. | FALSE |

FIG. 2

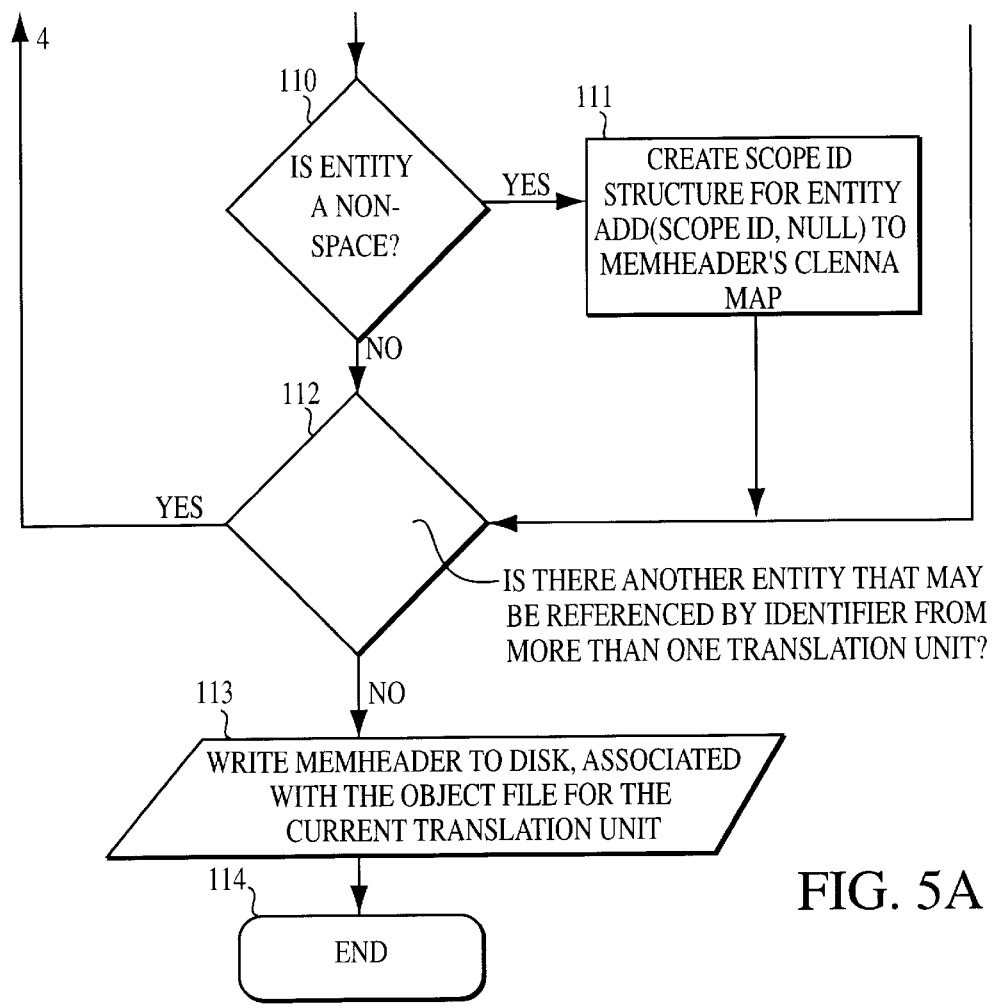
FIG. 5A
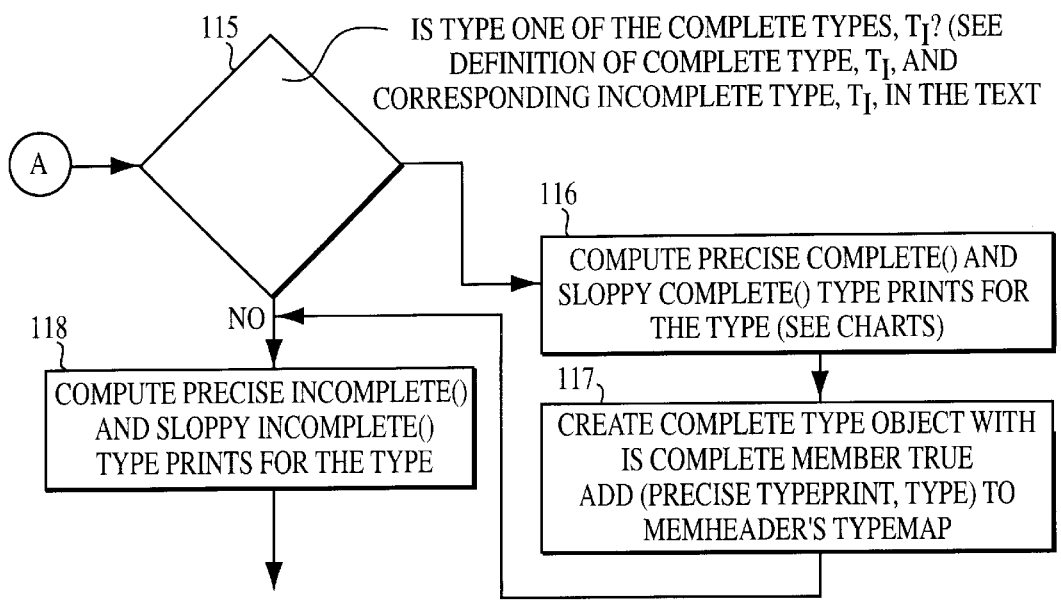

INDICATES A PADDING BYTE.

INDICATES AN INTERIOR DATA BYTE.

INDICATES "NO TYPE"
(IN THE ALGORITHM, THIS IS NULL).

SHORT, 2
CHAR, 1
COORD[3], 6
CHAR, 1
PATH, 8
COORD[3], 6
CHAR, 1

LINK-TIME AND RUN-TIME ERROR DETECTION, AND PROGRAM INSTRUMENTATION

REFERENCE TO APPENDIX

Software code corresponding to this invention is appended to the present application as Microfiche Appendix A (11 pages, 539 Frames) and is hereby incorporated herein in its entirety by reference.

A claim of copyright is hereby made by CenterLine Software, Inc. with respect to the software code contained in Microfiche Appendix A (11 pages, 539 Frames), as of the date of first issuance of a U.S. patent or foreign patent publication based on this application. The copyright owner has no objection to the facsimile reproduction by anyone of Microfiche Appendix A (11 pages, 539 Frames) as it appears in the Patent and Trademark office patent file or records, but reserves all other copyright rights whatsoever.

BACKGROUND OF THE INVENTION

This invention relates generally to systems for performing error checking, coverage analysis, or other kinds of run-time analysis of computer programs written in high level programming languages such as C and C++. More specifically, it relates to systems that perform analysis and instrumentation of the source code of programs, and use that analysis and instrumentation to report useful information, including programming errors, program code coverage analysis, and other information as the program is linked and as it runs.

Programming tools that help automatically detect programming errors and that provide code coverage analysis have proven to be an important part of a programmer's arsenal. Consider the case of automatic detection of programming errors in programs written using high-level languages such as C and C++. The errors that could be detected automatically can be broadly categorized as follows:

Compile-Time Errors

These errors are well-described in the literature, and have been detected by many different kinds of programming tools. Most traditionally detected by a high level language compiler, examples of compile-time errors include:

CT1. Incorrect syntax
CT2. Use of undefined identifiers
CT3. type mismatches: for instance, calling a function using an actual parameter whose type is sufficiently different from the type of the corresponding formal parameter.

Compile-time errors are mentioned here only for the purpose of differentiating them from link-time and run-time errors.

Link-Time Errors

Because many high level programming languages support the notion of separate compilation of program modules, there is a possibility of introducing programming errors that cannot be detected until those separately compiled modules are combined into a single executable program, or into a shared library module, or into a relocatable object module.

Examples of link time errors that could be detected are:

LT1. Multiple definitions of a global function or variable, when only one definition is allowed, or a missing definition of a global function or variable.
LT2. Mismatches between the size of a variable declared in one module and defined in another module.
LT3. Type mismatches between the declaration of a function in one module and its definition (or a second declaration of it) in another module.
LT4. Type mismatches between the declaration cf a variable in one module and its definition (or a second declaration of it) in another module.
LT5. Mismatches in the definition of a type declared in one module, versus the definition of a type with the same name in another module, when the definitions should be the same.

In the case of a program written in the C++ programming language, the above link-time errors are described in a set of rules that are formally described in the draft ANSI C++ standard, and called the "One Definition Rule" (Document X3J16/96-0225 or WG21/N1043, "Working Paper for Draft Proposed International Standard for Information Systems-Programming Language C++," Dec. 2, 1996; Section 3.2, "One Definition Rule," is the section relevant to link-time checking; this document is referred to herein as the "C++ Working Paper"). Note that there are similar, but different rules for programs written in the C language, as specified in its ANSI standard (American National Standard X3.159-1989, "American National Standard for Information Systems-Programming Language C"; the section relevant to link-time checking is section 3.1.2.6, "Compatible Type and Composite Type.").

Run-Time Errors

Some errors cannot in general be detected until a program actually executes.

Examples of such errors are:

RT1. Indirection through a pointer that does not point to a valid object, For example, indirection through a pointer to an object whose associated memory has been freed, or indirection through an uninitialized pointer.
RT2. Indexing beyond the legal bounds of an array object,
RT3. Indexing beyond the bounds of an array object that is contained within an enclosing object.
RT4. Incorrect interpretation of the type of object designated by a pointer. In the case of C or C++, this can happen because the program performed an unintended or illegal type cast operation, or the program accessed a member of a union after a value was stored in a different member of the union, or the program released a dynamically allocated chunk of memory, then reallocated that same memory as a different type.

Instrumentation

Program instrumentation is a technique that has been used in the implementation of run-time error checking as well as code coverage analysis, as well as other program analysis. Code coverage analysis provides a programmer with information to determine how well a program has been tested, by measuring how many different logical paths through the program have been executed, accumulating the information over several independent executions of the program. To instrument a program is to add additional expressions and/or statements to an existing program for the purpose of analyzing the behavior of that program, while still maintaining the original meaning of the program so that it continues to execute as originally intended by the programmer.

Prior Link-Time Error Detection Techniques

Program linkers (sometimes called "link editors") such as UNIX's ld have traditionally provided link-time error detection for errors such as LT1. A linker compares all of the declarations and definitions of a given function or variable in order to do its job; it is trivial for the linker to detect error LT1 at the same time.

To detect LT2, the object file symbol table records the size of a variable even when the variable is only referenced (some object file formats record only the sizes of defined variables, not the sizes of referenced variables). Once these sizes are available to a linker, it can issue an error message if all the sizes for a given variable are not equal. Sun Microsystems's linker id on SunOS 5.4 on the SPARC architecture detects LT2.

Lint reports many inter-module inconsistencies in C programs, including many instances of LT3 and LT4. Lint and its checks for inter-module consistency are mentioned in S. C. Johnson and D. M. Ritchie, "Portability of C Programs and the UNIX System," Bell System Technical Journal 57(6) part 2, 1978, pp. 2021–2048.

Most C++ compilation systems check that the type and number of function parameters are consistent across translation units. B. Stroustrup: Type-Safe Linkage for C++. Proc. USENIX C++ Conference, Denver, pp 193–210. October, 1988. Also, USENIX Computing Systems, V1 no 4, Fall 1988, pp 371–404.

ObjectCenter detects LT1 through LT5 (G. Wyant, J. Sherman, D. Reed, and S. Chapman, "An Object-Oriented Program Development Environment for C++," Conf. Proc. Of C++ At Work 1991). But its implementation is different from the invention described here. Hash codes are not computed for types; instead, complete type information is kept for the entire program being checked. Because type information is so complete, the type graph (the type data structures together with the pointers between them) is large and highly connected (in particular, unlike in the present invention, ObjectCenter type graphs are cyclic). See also S. Kendall and G. Allin, "Sharing Between Translation Units in C++ Program Databases," Proc. 1994 USENIX C++ Conference.

The program linker included with IBM's C Set ++ C++ programming environment implements LT3 and LT4 (IBM, C Set++ for AIX User's Guide, Version 3 Release 1, 1995).

The DEC Systems Research Center implementation of the Modula-3 programming language, called SRC Modula-3, implements LT1 through LT5 for that language (the source code of the DEC SRC Modula-3 system is currently available at http://www.research.digital.com/SRC/modula-3/html/srcm3.html; the language is defined in G. Nelson, ed., *Systems Programming with Modula-3*, Englewood Cliffs, N.J.: Prentice Hall, 1991). SRC Modula-3 uses hash codes as stand-ins for data types.

Prior Run-Time Error Detection Techniques

Some high level languages such as ADA and Pascal have traditionally included support for detection of run-time errors in their programming systems (the compiler, linker, and debugger). In fact, in ADA, detection of many run-time errors is mandated by the language definition. Languages such as C and C++ have not had this traditional support, and their ISO standards (draft standard in the case of C++) do not mandate support for such checks. Nonetheless, several programming tools have added support for detection of run-time errors: for example, BCC (Kendall, Runtime Checking for C Programs, USENIX, Software Tools, Summer 83 Toronto Conf. Proceedings, pp. 6–16), ObjectCenter, TestCenter, Purify (Hastings, U.S. Pat. No. 5,535,329), and Insure++ (Parasoft Corporation, Insure++ Automatic Runtime Debugger User's Guide, 1995).

Run-time error checking in ObjectCenter was based on an interpreter, which is an execution engine for programs that executes a sequence of byte codes. In this technique, the logic to perform the run-time checking was embedded in the logic of the execution engine itself, and was not represented in the byte codes, which were simply a representation of original source program.

In Purify and TestCenter, run-time error checking is accomplished by instrumenting object code.

Prior Instrumentation Techniques

A traditional programming language processor (for example, a compiler) accepts a textual representation of a program as input and produces some machine-readable representation of the program as output. The output might be an instruction sequence suitable for execution on a microprocessor, or a byte code stream executable by an interpreter, or even source code in the same or a different high-level programming language. An instrumentor adds additional code to the generated code to measure some aspect of the program's behavior. For example, an instrumentor might add code to measure the number of times a function is called, whether or not a particular section of code was executed, or whether a pointer that is about to be dereferenced points to valid storage.

Often, an intermediate representation of the program, called a "syntax tree," is built by a language processor front-end as the input is parsed. Then, the syntax tree is transformed into the final output representation by the language processor back-end. By modifying the syntax tree after the input has been parsed, an instrumentor can add the instrumentation code required; the back-end will then generate code corresponding to the instrumented program.

Parasoft describes a technique that inserts special error-checking nodes as parents of normal syntax-tree nodes (Kolawa et al., U.S. Pat. No. 5,581,696).

SUMMARY OF THE INVENTION

The invention described herein includes a collection of techniques whose purpose is to improve the state of the art in link-time and run-time error detection in high-level languages such as C and C++, and to improve the state of the art in adding instrumentation to programs for the purpose of run-time error detection, code coverage, or for any other analysis of programs at run-time.

For link-time and run-time error detection, the inventive techniques include a method of computing typeprints or augmented hash codes on data types. As used herein the term "data types" refers to the types of functions as well as of other data, as well as other entities described more than once in program source code that are required to be identical across descriptions of a given program entity, unless a more limited meaning of "data type" is clear from the context of its usage. For example, inline member function definitions in C++ are required to be identical across translation units.

For link-time error detection, the inventive techniques include a method that can be used to compare declarations of programming language entities from separately compiled modules for the purpose of checking the consistency of those declarations. This method can also be used to detect certain inconsistencies between the use of a type in one module and its definition in another module.

For run-time error detection, the inventive techniques allow for the recovery of the type of a region of memory in languages, such as C and C++, that do not ordinarily allow programs to recover such information. This type information allows a run-time checking implementation to diagnose errors such as RT3 and RT4 (from above).

In certain embodiments, this method involves recording the type of each memory object in a collection of tables. Then a lookup algorithm takes as input a memory address and desired type, and provides as output the appropriate bounds for an object at that address with that desired type.

For general instrumentation, the inventive technique includes a method for adding instrumentation to ASTs (abstract syntax trees) using annotations, which allow the process of tree rewriting to be separated from the instrumentation itself. The method makes it easier to understand and therefore verify the correctness of the instrumentation, and can also allow multiple, independent instrumentations to be described independently of each other, but both to be simultaneously executed in the same instrumented program.

Another advantage of the technique is the fact that a transformation phase yields an AST (abstract syntax tree) that uses the original node types (i.e., nodes that express the syntax of the original programming language independent of instrumentation); therefore, no changes need to be made to other algorithms that use that same AST representation as input (e.g., optimizers, machine code generators, source code generators). In certain embodiments the method involves modifying a syntax tree with pre-expressions, post-expressions and clone-expressions; these extra annotations describe the code to be added for instrumentation; only in a later canonicalization phase are the annotations transformed and expressed using the node types of the original unannotated syntax tree itself. Instrumentors that employ this technique can be used to add run-time error checking to languages that do not otherwise specify such checking (C, C++, as opposed to ADA, Pascal, modula-3), and to add code coverage instrumentation.

Numerous other features, objects, and advantages of the invention will become apparent from the following detailed description when read in connection with the accompanying drawings.

BRIEF DESCRIPTION OF THE DRAWINGS

FIGS. 1 and 2 are tables illustrating how to compute precise and sloppy typeprints, respectively, in accordance with the invention.

DETAILED DESCRIPTION

Figure 3:
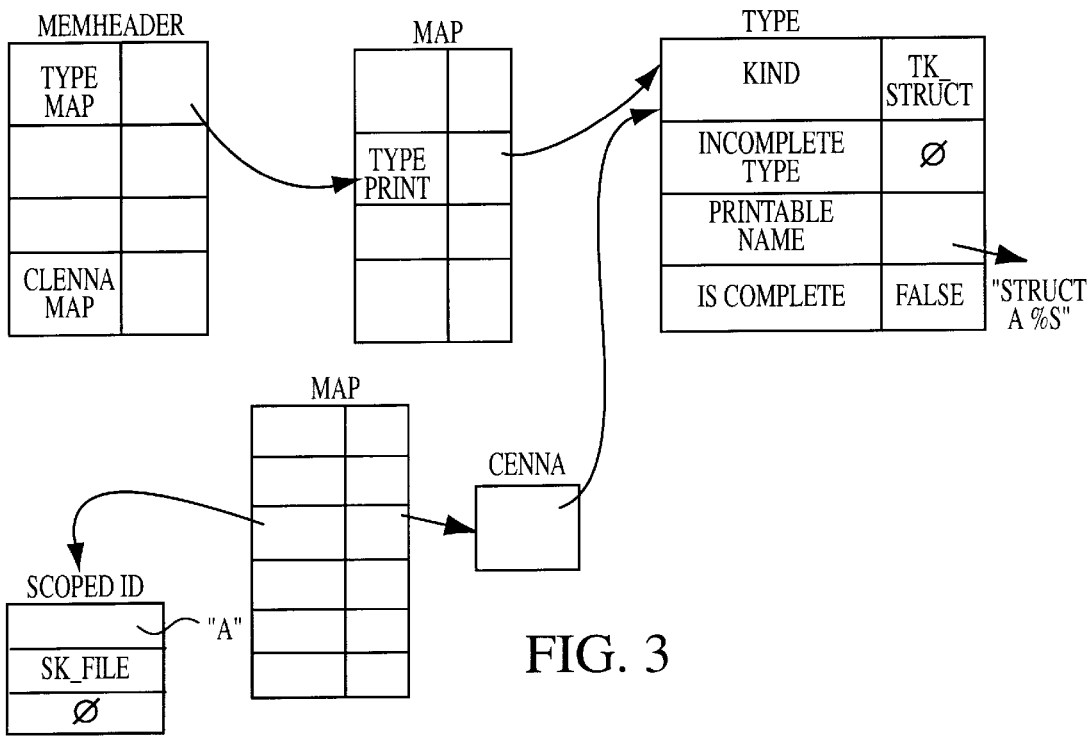
FIG. 3 is a diagram of a class or enum object and an incomplete data type represented in the class or enum object.

In this section the inventive concepts are described in detail, subdivided into the following subsections: techniques for link-time error detection, a technique for run-time error detection (type and bounds recovery for C and C++ pointers), and a technique for program instrumentation (clone-expressions, and expression annotations).

Checking Consistency of C and C++ Declarations at Link-Time computing typeprints This section describes the computation of a "typeprint" on a C or C++ data type. These typeprints are used to compare the data types corresponding to program entities of the software program to be tested, in order to determine whether there are multiple data types improperly corresponding to a common given program entity.

This section describes computing typeprints from C or C++ data types in the abstract, but in practice the computation can be accomplished given the internal representation of types to be found in almost any C or C++ compiler (note that this computation is not designed to be applied to the per-entity data structures described below, since the per-entity data structures lack much information necessary for computing typeprints; in fact, typeprints are part of the per-entity data structures).

The typeprints of the embodiment described below are not just hash codes. Rather, they are ordered pairs (hash-code, is-partial). The most straightforward representation of such a typeprint is as a C/C++ struct type, e.g.:

struct Typeprint{ unsigned long hashCode; bool is Partial; };

In the present implementation, however, to save space, the is Partial bit replaces one of the bits of the hash code; there are actually 63 significant bits of hash code and one bit of is Partial. It is important which bit of the hash code you replace in this way. For hash codes computed from small inputs, only a few, generally low-order, bits of the result are significant. It is important not to replace one of these low-order bits with the is Partial bit, or the uniqueness of the hash codes may be compromised.

A data type is "partial" when some features of the data type are not specified and when the following conditions hold true:

1) given any second data type, identical to the first data type except that some features left unspecified in the first data type are specified in the second data type, these two data types can be applied to the same program entity without error; and 2) the first data type is not incomplete (defined below).

The is-partial bit is used to mark types that will later be exempted from ODR (one definition rule) violations, such as partial specifications of array types (no bound) and partial specifications of function types (no parameters). This bit basically marks the types that must be exempted from the ODR checking at link-time because their hash codes cannot be compared for equality. Similarly, if a run-time error about some conflict is about to be generated, and it is found that one of the types has the is-partial bit set, the message is not generated. This is a novel way of taming the unusual type structure of C++ and particularly C, with their partial specification of array types (no bound) and function types (no parameters).

The is-partial bit and the type hash code are computed together. Computing these separately could require much duplicated code and could be error-prone if the duplicated code were even slightly different.

Each data type actually has up to four distinct typeprints, since a typeprint can be "precise" or "sloppy," and "complete" or "incomplete."

A typeprint that encodes only the name and an optional category identifier of a data type is "incomplete." Otherwise, a typeprint is "complete."

A typeprint that encodes all aspects of a data type that are intended to be checked for equality is a "precise" typeprint. A typeprint that encodes some but not all such aspects is a "sloppy" typeprint.

The type

```
struct A { int i; };
``` has a precise, complete typeprint, a precise, incomplete typeprint, a sloppy, complete typeprint, and a sloppy, incomplete typeprint. Other types, for example

```
struct B; // Forward-declared only
``` have only a precise, incomplete typeprint and a sloppy, incomplete typeprint. Yet other types, for example int, have four typeprints, but only two are distinct: the precise, complete and precise, incomplete typeprints are equal, and the sloppy, complete and sloppy, incomplete typeprints are equal.

The division of typeprints into complete and incomplete is a mechanism for breaking cycles in the type graph. These cycles that could otherwise make computing a typeprint impossible (i.e., a hash code of one type might depend on a hash code of another type that in turn depends on a hash code of the first type). The division of typeprints into complete and incomplete typeprints codes is carefully designed to avoid such cycles while providing as much information as possible for purposes of comparison of typeprints with each other. In the section below entitled "generating ODR messages from the data" we describe how these comparisons are implemented.

The division of typeprints into precise and sloppy typeprints corresponds to a division between mild ODR violations and serious ODR violations. The latter results from sloppy typeprints corresponding to a common program entity being different, while the former results when only the precise typeprints are different. As described below in the section below entitled "generating ODR messages from the data," precise typeprints are compared with each other first, and then if any ODR violations are found the sloppy typeprints are compared with each other.

An alternative implementation of precise and sloppy typeprints is to compute two different kinds of sloppy typeprints that partition between them all aspects of a data type that are intended to be checked for equality. An ordered pair of these two sloppy typeprints of a given data type constitutes a complete typeprint of that data type and can be used as such.

Both link-time checking and run-time checking make use of typeprints.

This computation assumes some underlying hash algorithm. This hash algorithm is expected to be able to compute a hash code on a sequence of zero or more bytes or characters of storage, and also to be able to combine two or more hash codes into a single hash code.

The underlying hash interface and algorithm is derived from the Fingerprint interface in the DEC SRC Modula-3 system (the interface is documented in J. Horning et. al., "Some Useful Modula-3 Interfaces," SRC Research Report 113, Digital Equipment Corporation, 1993, pp. 42–46). Any one-way hash function used in cryptography will probably work just as well, if not as fast (B. Schneier, "Applied Cryptography: Protocols, Algorithms, and Source Code in C," New York: Wiley and Sons, 1994). The implementation described herein depends on the uniqueness of these hash codes; hash codes are compared for equality to determine if two types are the same and thus can be merged. Note that very few hash algorithms have a low enough probability of collision to make this dependence practical.

The existence of some typeprint constants called $C_{void}$, $C_{array}$, etc, is assumed. These constants should be probabilistically unique in the universe of typeprints. One method of computing these constants is to hash the associated text, e.g., hash("void"), hash("array"), etc. The is Partial component is false for all of these constants.

The implementation described herein also makes use of Combine( ). The operation Combine( ) on two or more typeprints yields an ordered pair whose left component is the combination of the hash code components and whose right component is the logical OR of the is-partial elements.

computing precise typeprints

The table of FIG. 1 shows how to compute the "precise" typeprint of each type. This table actually describes two functions on types T: PreciseComplete(T) and PreciseIncomplete(T). In the table, these functions are used recursively, and for brevity are called Complete( ) and Incomplete( ).

The is-partial component P of PreciseComplete( ) is as follows: if the result is computed by Combine( ), then use that result; otherwise false.

The is-partial component P of PreciseIncomplete( ) is as follows. First compute $P_1$=if the result of PreciseIncomplete( ) is computed by Combine( ), then use that result; otherwise false. Second, P is the logical OR of $P_1$ and the value specified in the "Incomplete is-partial" column.

computing sloppy typeprints

The table of FIG. 2 shows how to compute the "sloppy" typeprint of each type. This table actually describes two functions on types T: SloppyComplete(T) and SloppyIncomplete(T). In the table, these functions are used recursively, and for brevity are called Complete( ) and Incomplete( ).

The is-partial component P of SloppyComplete( ) is as follows: if the result is computed by Combine( ), then see the definition of that function; otherwise false.

The is-partial component P of SloppyIncomplete( ) is as follows. First compute $P_1$=if the result of SloppyIncomplete( ) is computed by Combine( ), then see the definition of that function; otherwise false. P is the logical OR of $P_1$ and the value specified in the "Incomplete is-partial" column.

examples of typeprint computation

Here are two examples of typeprint computation. First, typeprints of the type "reference to const int" are computed.

```
PreciseComplete("reference to const int")
= Combine(C_reference, PreciseIncomplete("const int"))
= Combine(C_reference, Combine(C_const,
  PreciseIncomplete("int")))
= Combine(C_reference, Combine(C_const, C_int))
PreciseIncomplete("reference to const int")
= Combine(C_reference, PreciseIncomplete("const int"))
= . . .
= Combine(C_reference, Combine(C_const, C_int))
SloppyComplete("reference to const int")
```

-continued

```
= C_pointer
SloppyIncomplete("reference to const int")
= C_pointer
```

Second, typeprints of the type "struct A { float(*p)[ ]; }" are computed, that is, a struct containing a single member of type "pointer to array of unknown dimension of float".

```
PreciseComplete("struct A")
= Combine(NameOnlyHash("struct A"), complete hash of
base classes, complete hash of nonstatic members,
incomplete hash of static members, incomplete hash
of nested type members)
= Combine(Combine(C_struct, HashString("A")), C_empty,
Combine(C_public, HashString("p")),
PreciseComplete("pointer to array of unknown
dimension of float")), C_empty, C_empty)
    PreciseComplete("pointer to array of unknown
    dimension of float")
    = Combine(C_pointer, PreciseIncomplete("array of
    unknown dimension of float"))
    = Combine(C_pointer, SetPartial(Combine(C_array, 0,
    PreciseIncomplete("float"))))
    = Combine(C_pointer, SetPartial(Combine(C_array, 0,
    C_float)))
```

Notes: The function SetPartial( ) returns its typeprint argument with the hash code unchanged but with the is Partial component set to true. PreciseComplete("struct A") itself has an is Partial component of true, because the partialness has "bubbled up" from below. $C_{empty}$ is introduced here to represent the hashing of an empty list, e.g., the list of base classes, and $C_{public}$ is introduced here to represent the hashing of the "public" access specifier.

```
PreciseIncomplete("struct A")
= NameOnlyHash("struct A")
= Combine(C_struct, HashString("A"))
SloppyComplete("struct A")
= Combine(C_struct, complete hash of base classes,
complete hash of nonstatic members excluding
nonvirtual function members)
= Combine(C_struct, C_empty, Combine(HashString("p"),
SloppyComplete("pointer to array of unknown
dimension of float")))
= Combine(C_struct, C_empty, Combine(HashString("p"),
C_pointer))
SloppyIncomplete("struct A")
= C_struct
```

The following features of typeprints have as their sole purpose that of suppressing spurious error messages:

1) The is Partial bit.
2) Sloppy hash codes.
3) The fact that NameOnlyHash( ), a piece of the algorithm for computing typeprints of class and enum types, hashes only the unqualified tag for types that are not obviously C++-only. For example, given this declaration:

struct A { struct B { int i; } b; };

the inner struct type is named "A::B" in C++, but it is named "B" in C. When computing a typeprint for a C++ translation unit, the name "B" is used, not "A::B", for hashing purposes, so that the type has the same typeprint in C and in C++. The consequences of this use of "B" are slightly strange for representing C++ programs. For example, the D::B in this declaration must also be typeprinted using "B", not "D::B":

struct D { struct B { int i; } b; };

This can result in unique types within a single C++ translation unit sharing the same representation.

4) The suppression of ODR messages for conflicts involving types with "tagless" names (this is a feature of the ODR message generation algorithm, actually).

checking consistency of C and C++ declarations at link-time

This section provides a detailed description of an implementation of the invention that checks to consistency of declarations across modules. The implementation includes the following elements:

1) Per-entity data, a small amount of data that is stored about each program entity (function, variable, or type);
2) algorithms for computing the per-entity data at compilation or translation time;
3) algorithms for combining the per-entity data when two or more modules are combined; and
4) algorithms for computing error messages from the combined per-entity data.

A few definitions: "translation unit" is as defined in the ANSI C standard, section 2.1.1.1, or its equivalent for other programming languages. A "module" is the result of compiling or translating a translation unit in many programming environments, modules are object files. A "tag" is the name of a C++ class or enum type or of a namespace, e.g., "A" in "struct A". A "tagless type" is a type with no tag, e.g., the type in "struct { int i; } x;".

per-entity data

Each program entity that may be referenced by an identifier from more than one translation unit (in C++ terms, each program entity having a name that has external linkage) is recorded in a data structure. These program entities are of the following kinds: function or variable, data type, namespace.

Each of these entities has a corresponding data structure, as follows. The data structures are presented in C++ syntax (except that for clarity of presentation, the order of the type declarations is not correct C++). Not all of these data structures bear a one-to-one relationship with the program entities represented, but the data structures declared below can still be called the Per-Entity Data.

```
// This is the root data structure.
struct MemHeader {
    Map<Typeprint, Type>         typeMap;
    MultiMap<ScopeId, FuncVar>   fvMap;
    MultiMap<ScopeId, Clenna>    clennaMap;
};
// Has field hashCode and bool field isPartial, and can be
// compared for equality or inequality.
typedef . . . Typeprint;
enum ScopeKind {
    sk_file, sk_function, sk_class, sk_namespace
};
    struct ScopeId {
    String    name;       // The unmangled innermost name,
                          // or "" if none.
    ScopeKind containingKind;
    Clenna*   container;  // NULL if containingKind
                          // is sk_file or
```

-continued

```
                                    // sk_function.
};
enum Refdef {
        rd_reference,          // extern declaration or class
                               // forward reference
        rd_common_definition,  // common variable
                               // definition or class
                               // definition
        rd_definition          // initialized variable or
                               // function definition
};
// Function or variable
struct FuncVar {
        Type*           type;
        Refdef          refdef;
};
// Class or enum or namespace
struct Clenna {
        Type*           type;   // NULL iff a namespace
};
enum TypeKind {
        tk_void,          // void
        tk_integral,      // integral types not including enum
        tk_float,         // floating-point types
        tk_struct,        // struct or class keyword
        tk_union,         // union
        tk_enum,          // enum
        tk_pointer,       // pointer
        tk_reference,     // reference
        tk_function,      // function including member function
        tk_ptr_to_member, // pointer to member
        tk_array,         // array
        tk_qualified      // cv-qualified
};
// A QualifierSet is zero or more qs_ constants or' d
// together.
typedef unsigned int QualifierSet;
const QualifierSet qs_const = 0x1;
const QualifierSet qs_volatile = 0x2;
struct Type {
        Typeprint sloppyTypeprint;
        TypeKind   kind;
        Type*             incompleteType;   // NULL if none
    union {
        // When kind == tk_array:
        struct {
          // The array dimension, or 0 if none.
          size_t          dimension;
          Type* element_type;
          } array;
        // When kind == tk_qualified:
        struct {
          QualifierSet    qualifiers;
          Type*           type;
        } qualified;
        // When kind is otherwise:
        struct {
          // This variable is true for complete types and
          // for reference types.
          bool    isComplete;
          // A human-readable type name witk "%s" in the
          // place of where the identifier would go in a
          // typedef. For example, the type "array of 10
          // pointer to int" has the printable name "int
          // *%s[10]". Missing tags are represented as
          // "<anonymous>". For example, the inner type
          // from the declaration "struct A { struct {} x;
          // }" might have as a printable name "struct
          // A::<anonymous> %s".
          String    printableName;
        } other;
    } variant;
};
```

The container templates Map<T, U> and MultiMap<T, U> are similar to the data structures of the same names in the C++ Standard Template Library (see the C++ Working Paper). Briefly, a Map<T, U> is a set of ordered pairs (t, u), where t is of type T and u is of type U; the t's of no two ordered pairs in a set are equal; and given a T value, it is a fast lookup to find the associated U. A MultiMap<T, U> is similar to a Map<T, U>, but each stored T value may be associated with more than one U value.

Here are some important properties of the per-entity data:

1. When a Type object exists that represents one of the complete types $T_c$ defined in the list below, then the Type object representing its corresponding incomplete type $T_i$ must also exist, and the "incompleteType" field of the Type object representing $T_c$ must point to the Type object representing $T_i$.

2. For a complete type that is a defined class or enum type, the corresponding incomplete type is the forward-declared type of the same name and class-keyword (struct/class, union, or enum) (the C and C++ language definitions do not include incomplete enum types, but because they are a common extension, and in order to treat enum types with the same algorithms as are used for class types, they are allowed here).

3. For a complete type "cv $T_c$", where cv is one of "const", "volatile", or "const volatile", $T_c$ is a complete type as defined in this list, and $T_i$ is its corresponding incomplete type, the corresponding incomplete type is "cv $T_i$".

4. For a complete type "array of N $T_c$", where TV is a complete type as defined in this list and $T_i$ is its corresponding incomplete type, the corresponding incomplete type is "array of N $T_i$".

The "name" member of a ScopedId is thc unmangled innermost name in the source code. In particular:

1. For a tagless type (including anonymous union), the empty string. Namespaces are never considered tagless. A namespace that is tagless in the source code will have a unique, generated name beginning with ":".

2. For a C++ function or user-defined operator with C++ linkage, the name is unmangled and includes a human-readable description of the arguments.

In general, names contain only necessary spaces, except that for cv-qualified member functions there is an (unnecessary) single space between the closing right parenthesis of the member function name and the first cv-qualifier. C++ functions with C linkage do not have the parameter types in the name.

Some example values of the "name" member of a ScopedId:

":13212492," "f(void)," "Stack<1000,Ptr<String>>,"

"operator*(const complex&) const," "printf."

Consistency between translation units is important, even between translation units written in different programming languages (for entities accessible in both programming languages).

Figure 4:
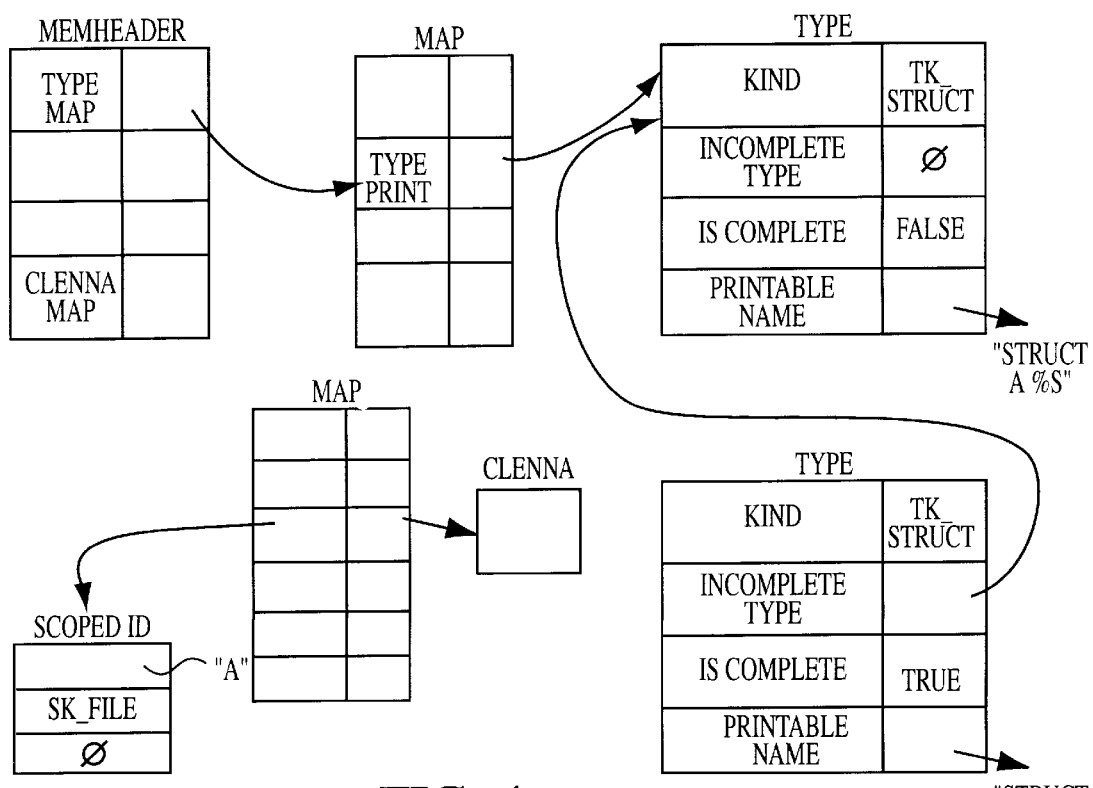
FIG. 4 is a diagram of a class or enum object and a complete data type represented in the class or enum object.

Each class or enum data type in the source program is represented by a single Clenna object. In the usual case, each Clenna object that represents a data type (as opposed to a namespace) has either one (for an incomplete data type) or two (for a complete data type) corresponding Type object. FIGS. 3 and 4 illustrate these two cases. Note that in FIG. 4 it is possible, though not necessary, to have a second Clenna object pointing to the Incomplete Type object.

Because the typeprint-generation algorithm can generate the same precise typeprint for data types that have different scoped names, there can sometimes be two or more Clenna objects that point to a single data type. For example, this C++ program will have two Clenna objects for "B" and "A::B", respectively, but both will point to the same complete Type object:

```
struct B { int i; };
struct A { struct B { int i; } b; };
```

There is also a third Clenna object, the one representing "A", but it is not relevant to this point.

initial generation of the per-entity data

MemHeader, the data structure that is the root of the per-entity data graph, is a fairly standard (if minimal) symbol table as discussed in Aho, Sethi, and Ullman (A. Aho, R. Sethi, and J. Ullman, *Compilers: Principles, Techniques, and Tools,* Reading, Mass.: Addison-Wesley, 1986). For this reason, most aspects of the generation of MemHeaders are not discussed any further here.

The per-entity data is generated from the intermediate code of a C and C++ translation tool. The intermediate code of nearly any C or C++ compiler will also be suitable for generating the per-entity data.

In the internal data structures of most C and C++ compilers, a complete type and its corresponding incomplete type are represented by a single object. Care must be taken to generate a pair of Type objects, with the complete Type pointing to the corresponding incomplete Type, in such cases. The strict separation of the complete and incomplete Type objects, even for representing complete types, allows us to represent in one MemHeader a set of translation units that violate the ODR, yet without losing any information.

Also, see the section "Computing Typeprints" above for how to compute the typeprint elements of the per-entity data.

writing the data to disk and reading it from the disk

There are a number of techniques for saving in-memory data structures to disk and later restoring them from disk. Here are references to a few: A. Birrell et. al., "Network Objects," "Software Practice and Experience," 25(S4):87–130, December 1995. Rogue Wave Software, "Tools.h++ Introduction and Reference Manual version 6," Corvallis, Oregon: Rogue Wave Software, 1994. (See the class RWCollectable.) Object Design, Inc., makes an object-oriented database that does these operations; see http://www.odi.com.

The method used to save and restore data structures is to design them to contain no pointers; all data structures are in arrays, array indexes substitute for pointers, and most data structures can thus be written and read bytewise. Container data structures are written as linear lists, and the lookup scaffolding (e.g., hash tables) are recreated when the data structures are read back into memory.

merging data

The workhorse algorithm here is one that merges one MemHeader into another:

```
void Merge(MemHeader& dst, const MemHeader& src);
```

This algorithm is used at link time as follows:

```
MemHeader b;         // initially empty
for (m in "modules being linked")
      Merge(b, ReadMemHeaderFromDisk(m));
      GenerateOdrMessages(b);
```

Considering a MemHeader to be three sets-a set of (Typeprint, Type) pairs, a set of (ScopedId, FuncVar) pairs, and a set of (ScopedId, Clenna) pairs-then Merge performs three set unions in place, copying elements from src into dst as necessary.

Care must be taken that all pointers in the resulting dst point to items in dst, not in src. This invariant can be ensured by copying in a depth-first manner (for an explanation of depth-first graph traversal, see T. Cormen, C. Leiserson, and R. Rivest, *Introduction to Algorithms,* Cambridge, Mass.: The MIT Press, 1990), or by copying in two passes: the first pass performs the actual copies and creates a "fixup map," which records the source and destination of each copy; and the second pass fixes up all pointers according to the fixup map.

While performing the set union, in comparing (Typeprint, Type) pairs for equality, the printableName member of the Type should not be compared. Printable names of types will often differ. For example, an otherwise identical type might have a printable name "struct B" when compiled in C, but "A::B" when compiled in C++.

In the full listing of Merge( ), more than a simple set union is performed. Instead, unequal elements are sometimes merged. For example, the data structures corresponding to these two declarations are merged:

```
extern int x;

int x=5;
```

This merging is a performance issue only. It reduces the size of the data structures, and it leads to fewer pairwise comparisons in GenerateOdrMessages( ).

MemHeaders resulting from a merge often have multiple FuncVar or Clenna objects that differ only in that one of them points to a complete Type object, while the other points to the corresponding incomplete Type object. GenerateOdrMessages( ) is robust against these multiple objects.

generating ODR messages from the data

Following is a description of the algorithm employed by

```
void GenerateOdrMessages(const MemHeader& mh);
``` the function that generates messages about ODR violations based on comparisons of precise typeprints.

Pass #1: For each scoped identifier si in clennaMap, skipping any si that includes at least one empty string as a name, copy the list of entities with the same name to clennaList (the ODR on entities is not checked with at least one empty component in their name because it is unclear what the rules are for these cases; examples of entities not checked include the type of the member x in "struct A { struct { int i; } x; }".). Via exhaustive pairwise comparison, winnow clennaList using OdrTypeCompare( ). If more than one item survives the winnowing, output the message "More than one type or namespace with the same name" together with the list of surviving items.

Pass #2: For each scoped identifier si in fvMap, skipping any si that includes at least one empty string as a name, copy the list of entities with the same name to fvList. Via exhaustive pairwise comparison, Winnow fvList using OdrFvCompare( ). If more than one item survives the winnowing, output the message "Conflicting declarations of the same function or variable" together with the list of surviving items.

Winnowing a list by exhaustive pairwise comparison means repeating the following algorithm until the list does not change during a complete pass:

```
for each possible pair of items (i1, i2) in the list {
        compare i1 tc i2;
        if i1 is better, throw i2 out of the list;
        if i2 is better, throw i1 out of the list;
}
Here are the functions OdrTypeCompare() and OdrFvCompare():
enum OdrPairRelationship {
        pr_left_is_better, pr_right_is_better,
pr_no_relationship
};
OdrPairRelationship OdrTypeCompare(Type* t1, Type* t2)
{
        if (t1 == t2) return pr_left_is_better;     // have to
                                                     // pick one
        if (t1->kind != t2->kind) return pr_no_relationship;
        switch (t1->kind) {
        case tk_array:
                // For a conflict like:
                //    A{incomplete} [10]
                //    A{complete} []
                //    The one with the array dimension is
                //    arbitrarily preferred. A new type is not
                //    generated
                //    A{complete} [10]
                {
                        OdrPairRelationship pr =
                        OdrTypeCompare (mh,
                                  t1->variant.array.element_type,
                                  t2->variant.array.element_type);
                        // If the element types have no relationship,
                        // neither do the array types.
                        if (pr == pr_no_relationship)
                          return pr_no_relationship;
                        // If the dimensions are equal, defer to the
                        // result of comparing the element types.
                        if (t1->variant.array.dimension == t2-
                        >variant.array.dimension)
                          return pr;
                        // Prefer a nonzero dimension.
                        if (t1->variant.array.dimension == 0)
                          return pr_right_is_better;
                        if (t2->variant.array.dimension == 0)
                          return pr_left_is_better;
                }
                // Dimensions are unequal and nonzero.
                return pr_no_relationship;
        case tk_qualified:
                // If the qualifiers are the same, defer to the
                // result of comparing the underlying types.
                if (t1->variant.qualified.qualifiers == t2-
                >variant.qualified.qualifiers) {
                        return OdrTypeCompare(mh,
                                  t1->variant.qualified.type,
                                  t2->variant.qualified.type);
                }
                return pr_no_relationship;
        default:
                {
                        // If the types are a complete/incomplete pair,
                        // prefer the complete.
                        if (t1->incomplete_type == t2)
                          return pr_right_is_better;
                        else if (t1 == t2->incomplete_type)
                          return pr_left_is_better;
                        // If either one is partial, give up completely
                        // and just prefer the other one.
                        // GetPreciseTypeprint is a fiction invented
                        // for this presentation. In this simplified
                        // presentation, types are manipulated via a
                        // pointer to struct Type. Unfortunately, since
                        // the precise typeprint of a type is not stored
                        // in the struct Type, there is no easy way to
                        // get from that pointer to the precise
                        // typeprint. So an invented function
                        // GetPreciseTypeprint() is used. In the actual
                        // code, types are manipulated via an index into
                        // the typeMap; from the index, either the
                        // precise typeprint or a pointer to the struct
                        // Type can be easily fetched.
```

```
                        pl_bool is_partial1 =
                          TypeprintIsPartial (GetPreciseTypeprint (t1));
                        pl_bool is_partial2 =
                          TypeprintIsPartial (GetPreciseTypeprint (t2));
                        if (is_partial2)
                          return pr_left_is_better;
                        else if (is_partial1)
                          return pr_right_is_better;
                }
                return pr_no_relationship;
        }
}
OdrPairRelationship OdrFvCompare (const FuncVar& item1, const
FuncVar& item2)
{
        OdrPairRelationship type_relationship =
                OdrTypeCompare(mh, item1.type, item2.type);
        if (type_relationship != pr_no_relationship) {
                // The types are related, so pick the more-defined
                // func or var.
                if (item1.refdef > item2.refdef)
                  return pr_left_is_better;
                else if (item1.refdef < item2.refdef)
                  return pr_right_is_better;
        }
        return type_relationship;
}
```

The technique described above compares precise typeprints. If this technique reveals the presence of data types having differing precise typeprints that correspond with a common program entity, a technique analogous to the one described above is then used to compare the sloppy typeprints of the data types. Based on the outcome of the comparison of the sloppy typeprints, the output message "More than one type or namespace with the same name" or "Conflicting declarations of the same function or variable" is qualified as being mild (in the event the sloppy typeprints match but the precise typeprints do not match) or severe (in the event both the sloppy typeprints and precise typeprints do not match).

In accordance with the techniques described above, there is no information kept on the source locations (e.g., filename and line number) of declarations, and so none is printed in the error messages generated by GenerateOdrMessages. It is straightforward, however, to add a source location to the FuncVar and Clenna data structures, and to print that information out at the appropriate time. This is the one tricky issue: in Merge( ), where two FuncVars or Clennas are compared for equality, the source location should not be included in the comparison.

Although the use of typeprints in connection with checking consistency of declarations at link-time has been described, it will be apparent to those skilled in the art that similar techniques can be used to check for consistency at run-time. At run-time, if the type-matching function based on comparison of precise typeprints returns an error, an additional step is performed that compares sloppy typeprints in order to cause the error to be classified as "mild" or "severe" in a manner analogous to the steps used to differentiate between "mild" and "severe" link-time errors.

Figure 5:
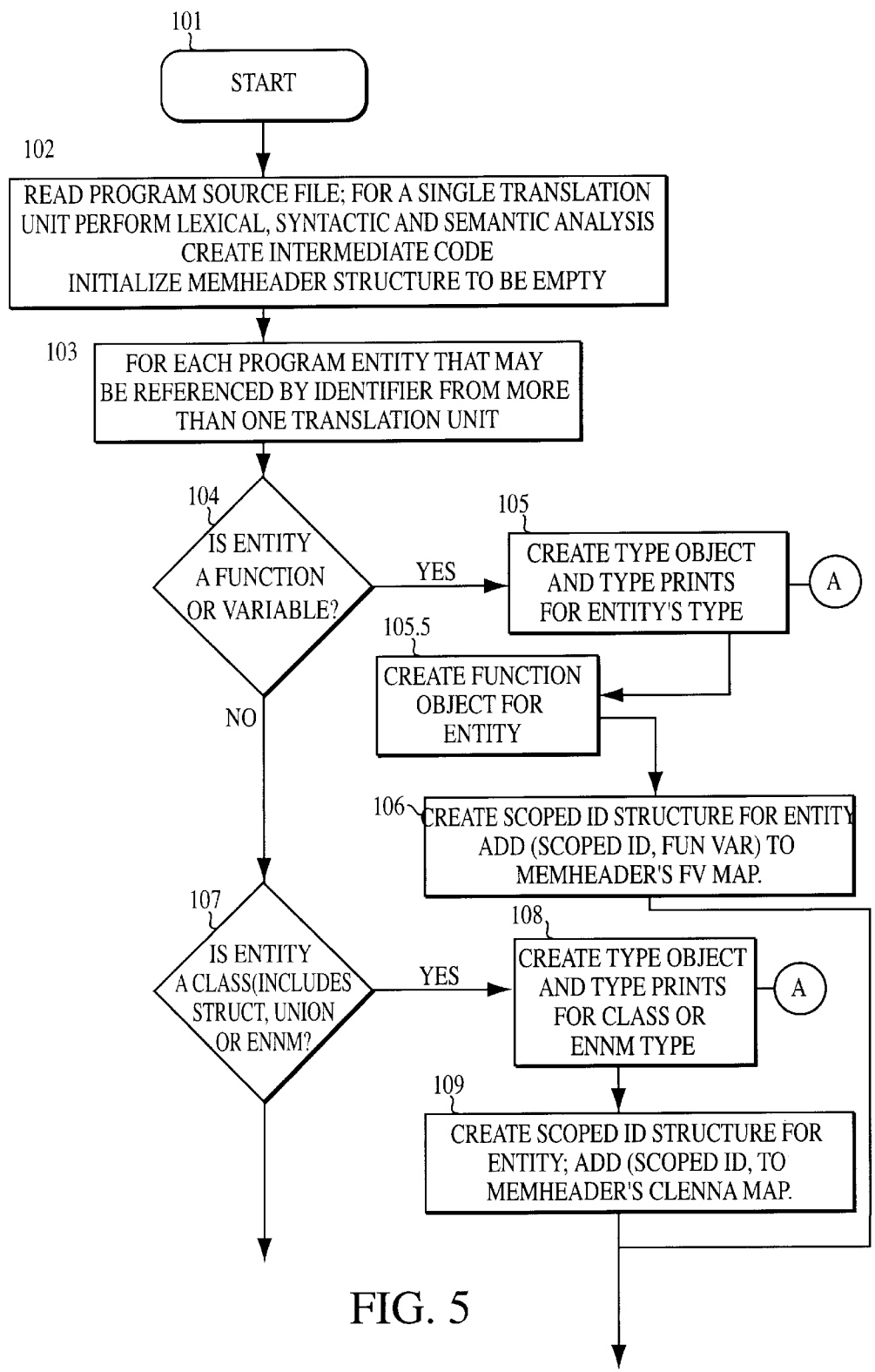
FIGS. 5–5J are a flowchart of the steps for checking consistency of declarations at link time in accordance with the invention.
Figure 5B:
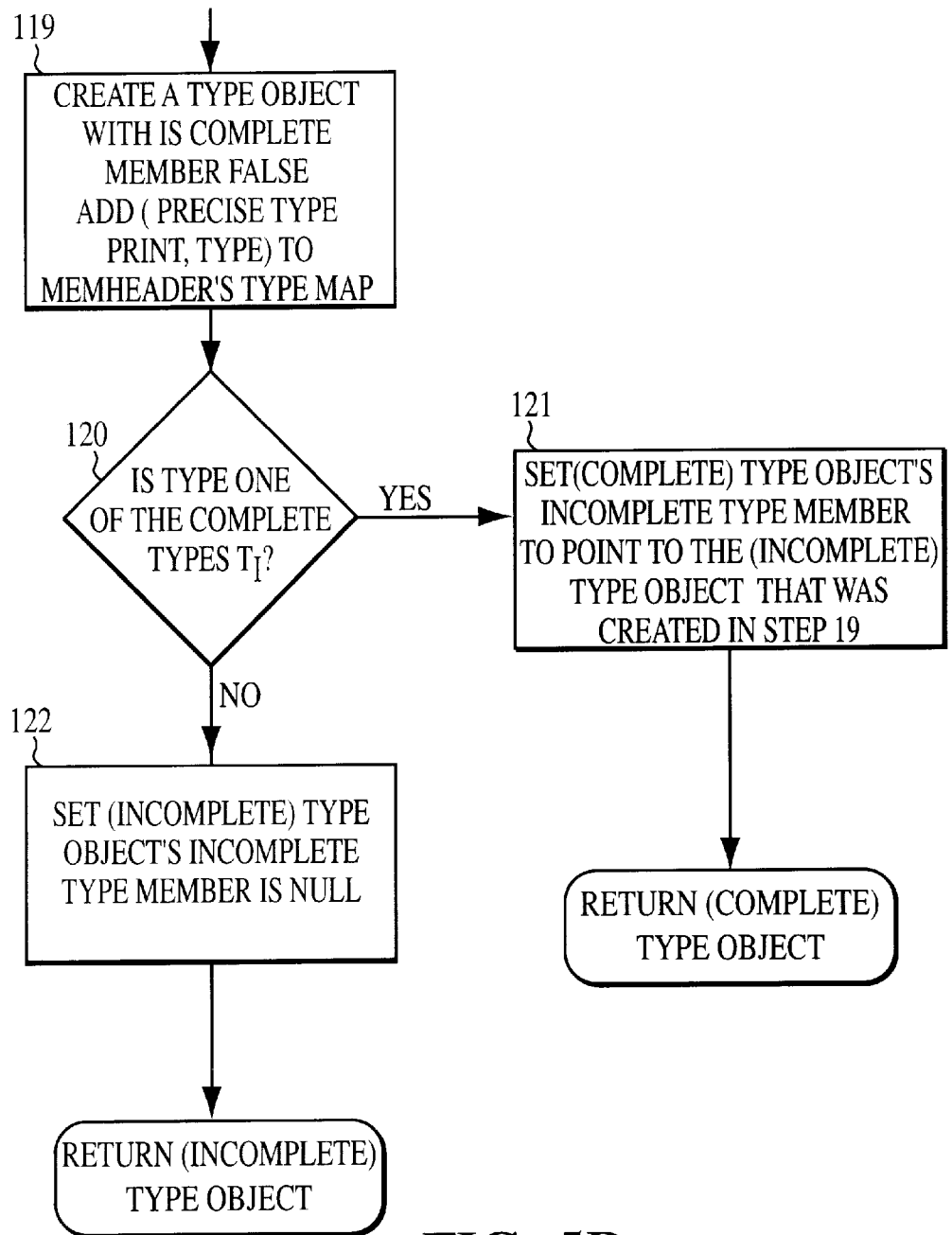
Figure 5C:
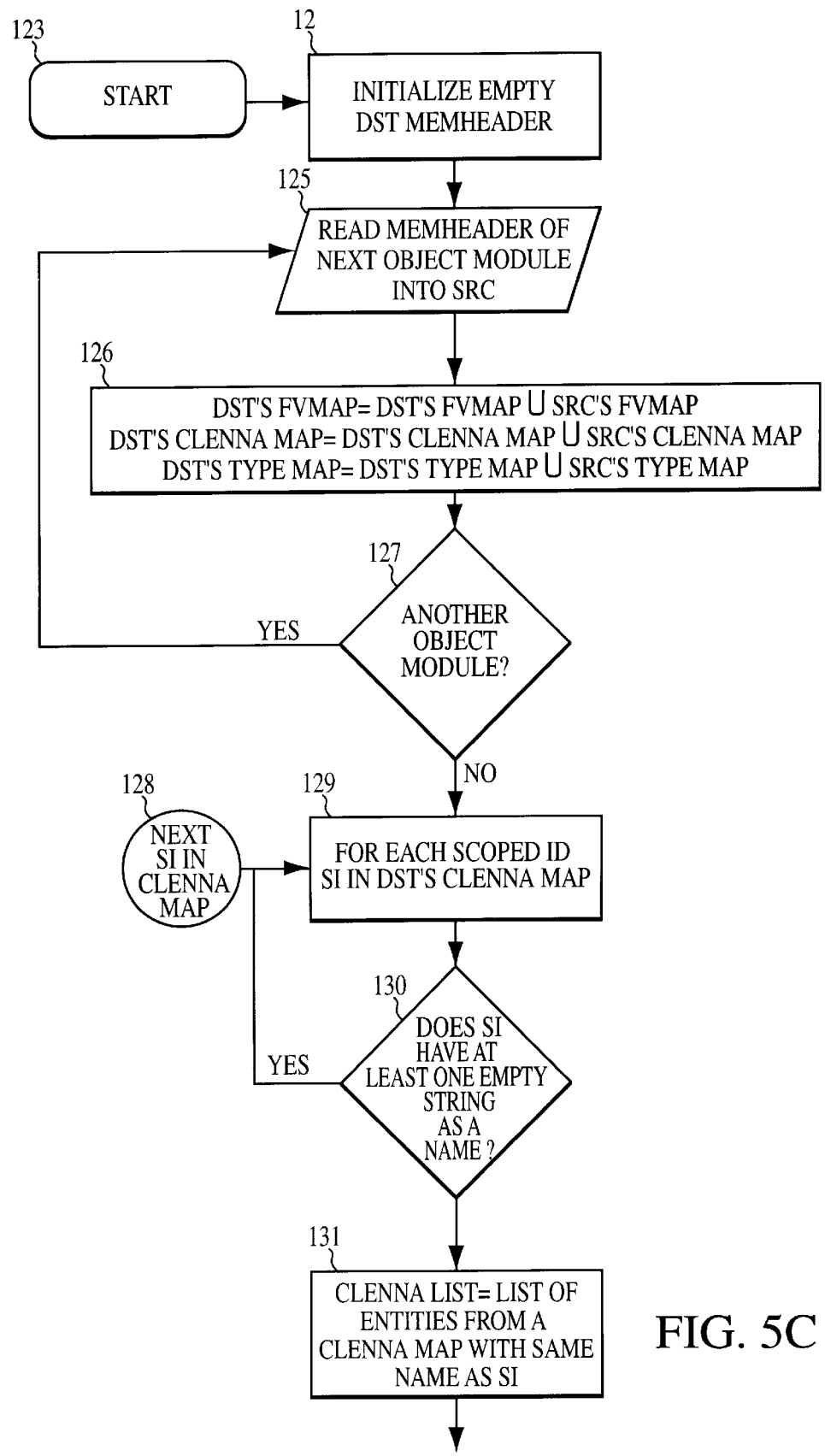
Figure 5D:
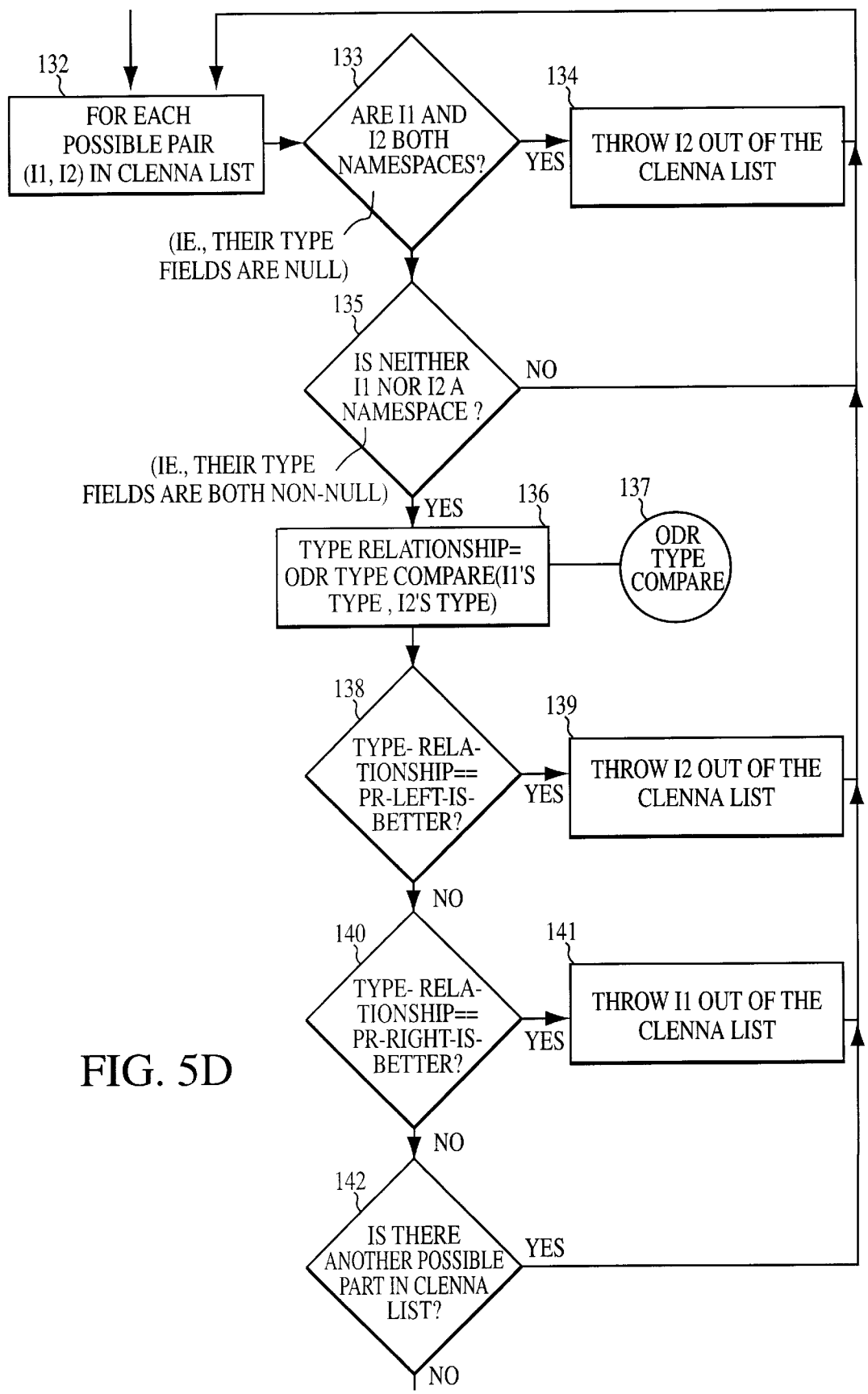
Figure 5E:
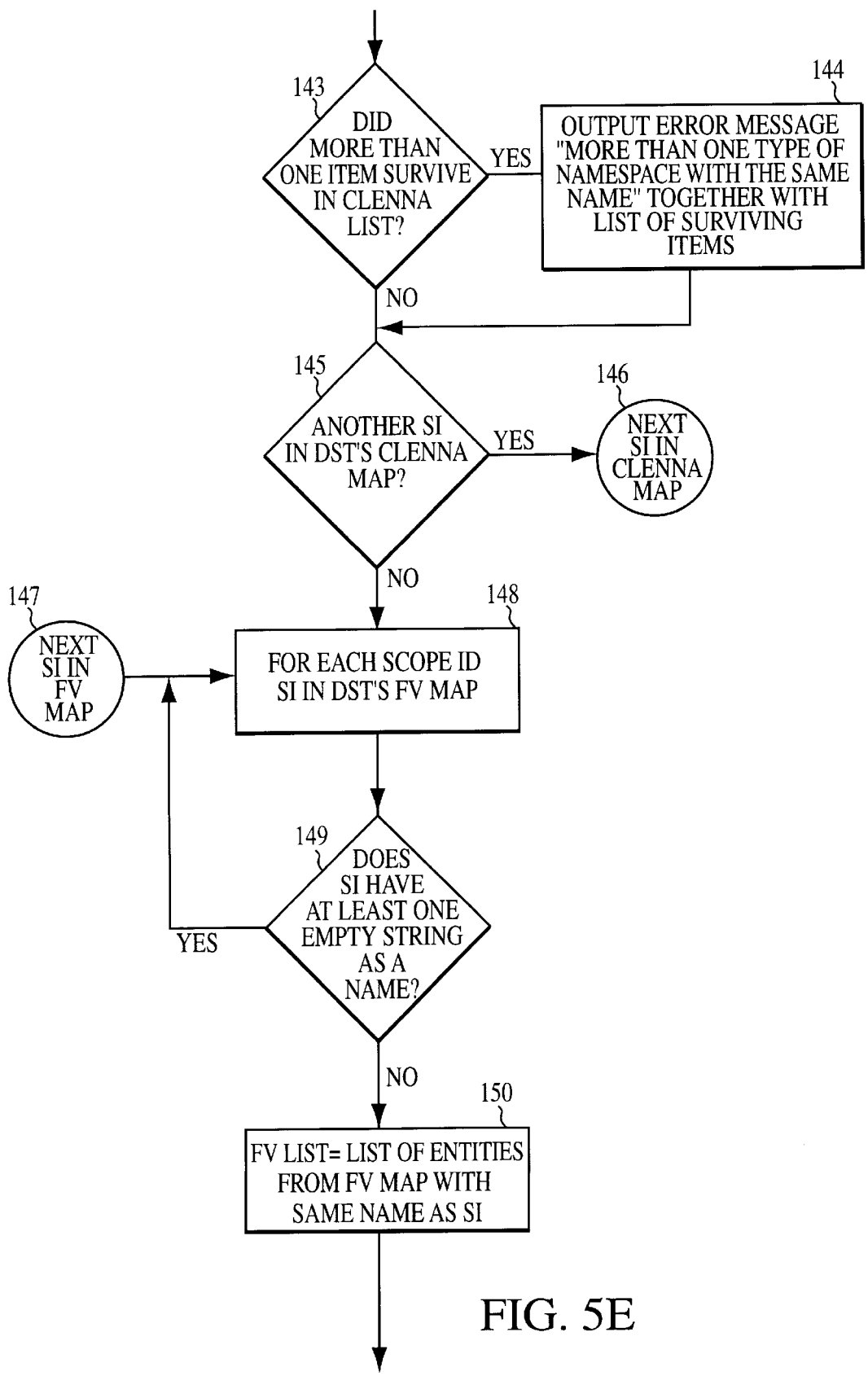
Figure 5F:
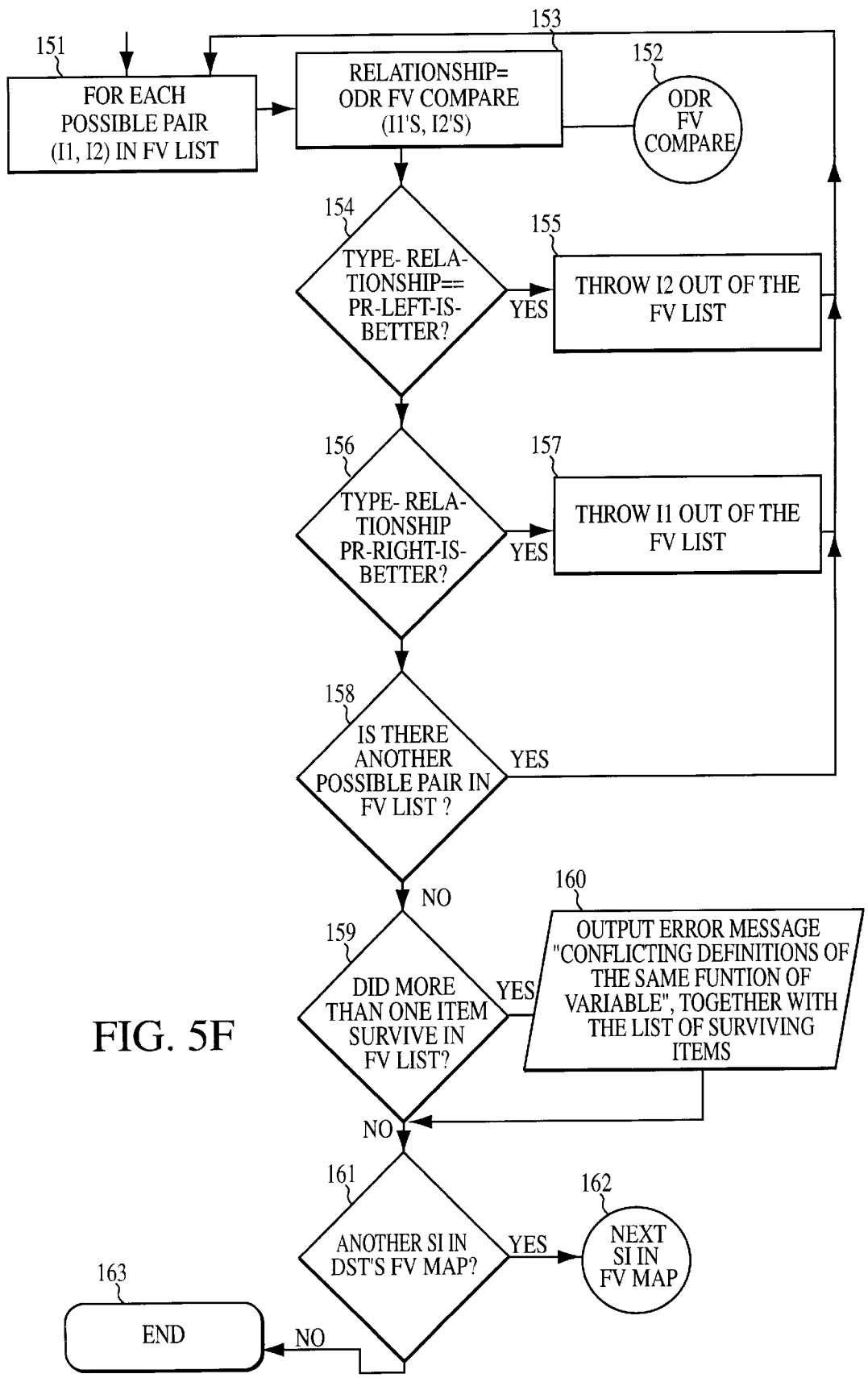
Figure 5G:
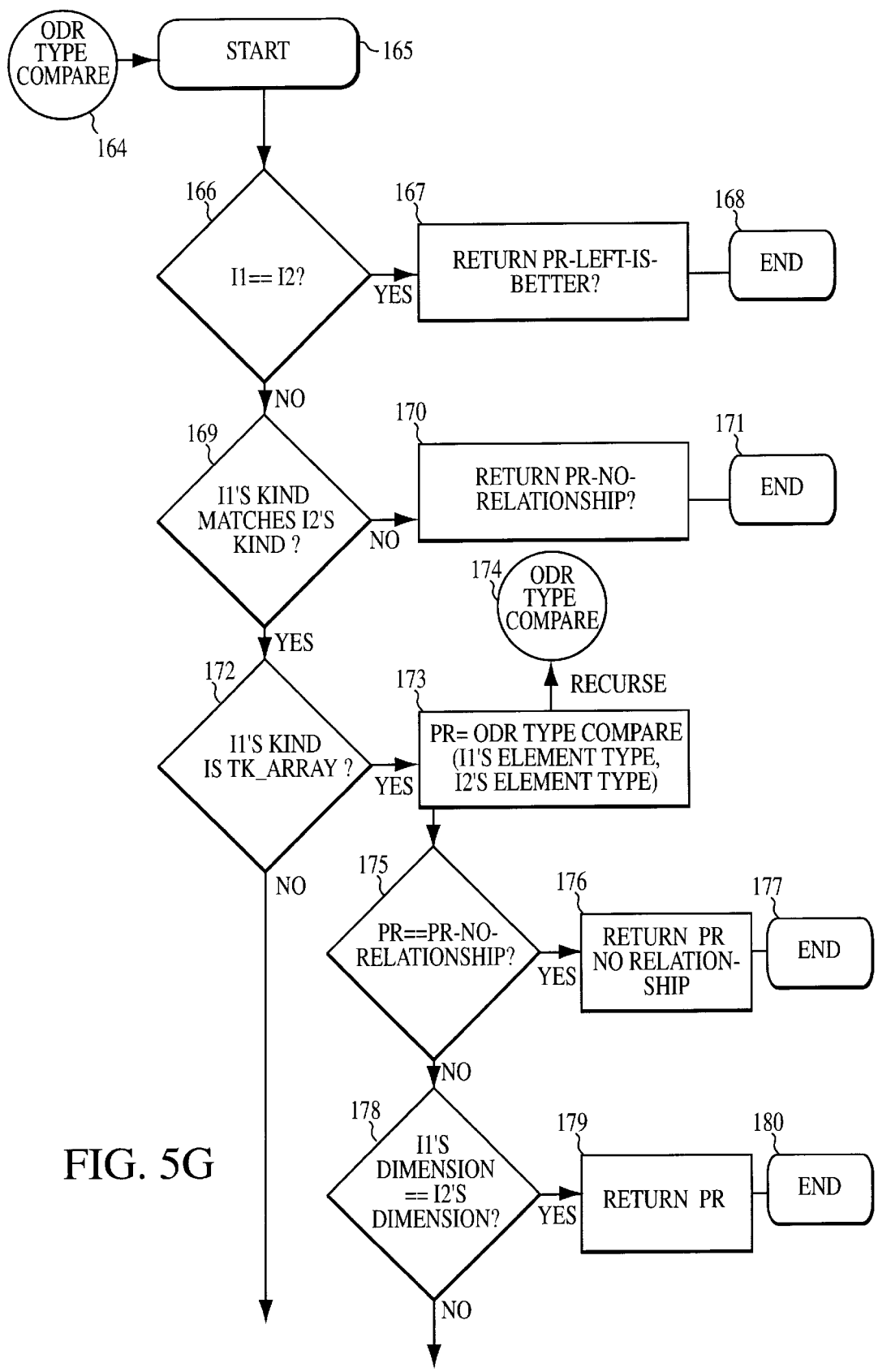
Figure 5H:
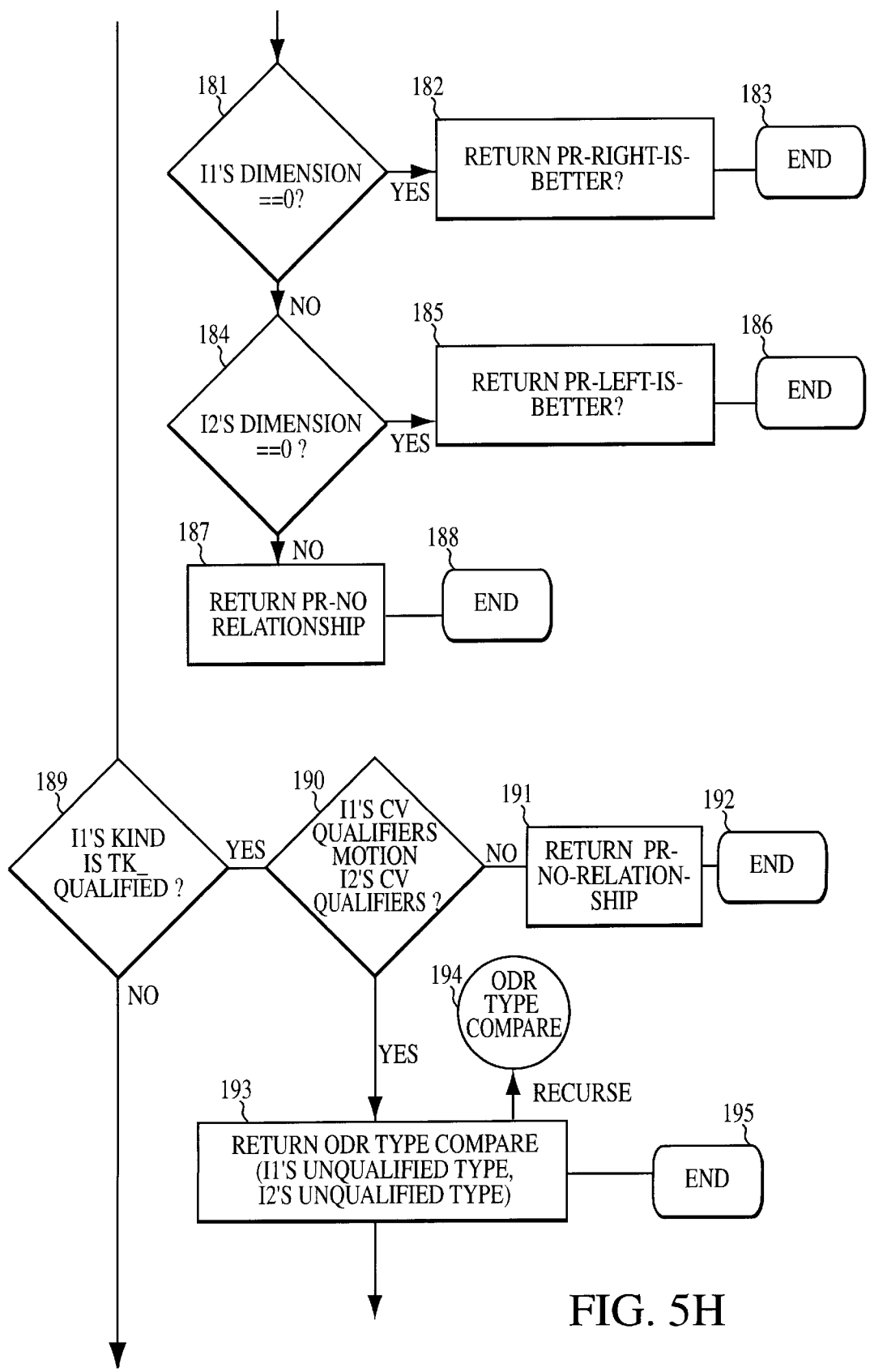
Figure 5I:
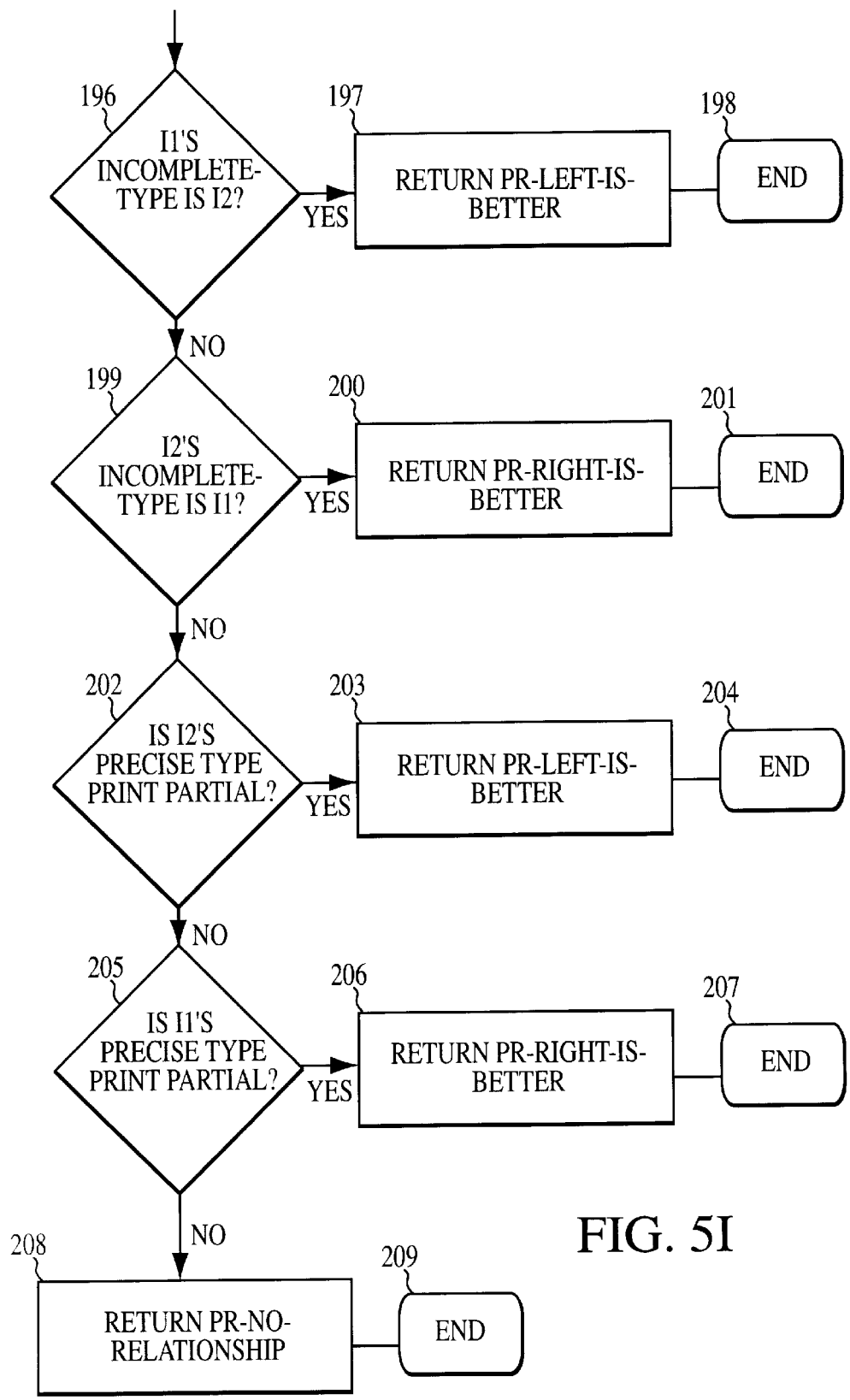
Figure 5J:
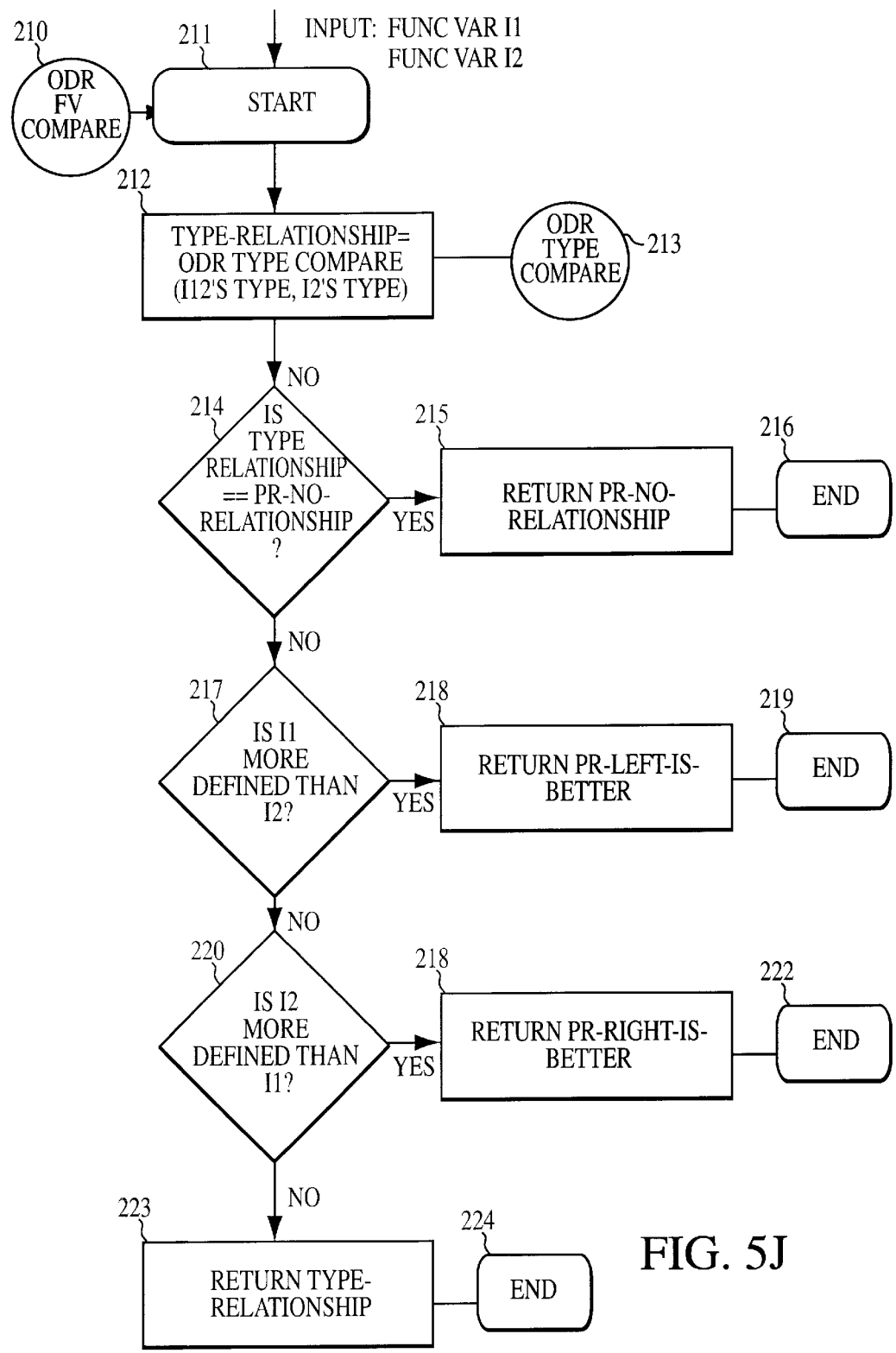

FIGS. 5–5J are a flowchart of the steps for checking consistency of declarations at link time in accordance with the invention.

In particular, steps 101–113 detail the initial generation of per-entity data. Steps 115–122 detail a subroutine to compute type objects and typeprints (note that steps 116 and 118 are recursive: each time a precise typeprint is recursively computed, a (type, typeprint) pair is added to the Mem-Header typemap).

Steps 123–163 detail the operation of GenerateOdrMessages, which generates messages indicating violations of the one definition rule. Steps 164–209 detail the operation of OdrTypeCompare, which is called by GenerateOdrMessages and which compares data types. Steps 210–224 detail the operation of OdrFvCompare, which is also called by GenerateOdrMessages and which compares data types corresponding to functions and variables.

Type and Bounds Recovery for C and C++ Pointers

The run-time error instrumentation techniques described herein support the ability to intermix instrumented and uninstrumented modules, and also allow (but do not require) the direct execution of native machine code.

Two important errors to check in C and C++ programs are indexing off the end of an array and improperly interpreting the contents of memory. To report these errors at run time an error checker must be able to discover the bounds of an array and determine whether an address references memory of a particular type. Furthermore, this process must be efficient. An instrumentor inserts calls to the run-time system to enable it to maintain a record of what types and bounds are associated with which addresses, and to query this information for purposes of reporting errors. The instrumentor could be a human programmer, or a source-to-source translator, or a source-to-object translator.

Note that the type information could be stored in one-to-one correspondence with each valid address. Instead, however, the error-checking run-time system according to the invention uses two data structures: the first maps pointers to the containers that they address, and the second maps the type and base address of the container, the offset within the container, and a desired type to a Boolean result (error or not) and a bound on the array or scalar with the desired type. Because many containers share the same type, this results in substantial space savings.

It is important to note the difference between type and bounds checking in languages such as C and C++ and type and bounds checking in languages such as Lisp, Eiffel, or Modula-3. In the latter (dynamically-typed, safe) languages, type information is used in ordinary programs, not just those being debugged, and so the typical implementations for those languages use run-time data representations that either include type information directly or make it readily accessible; container location is trivial and efficient. In C and C++, there is no standardized way to access dynamic type information for all types (although a subset of types in C++ do provide this capability when the newly proposed RTTI features are used) and implementations usually do not provide any other (non-standard) way to access this information. The run-time data representations do not include any type information at all (except when RTTI is used). To keep a record of type information without breaking binary compatibility with these other implementations, it is important to build hidden (from the program being debugged) data structures that describe the association between addresses and types. It is also important to note the difference between dynamic type checking and mere container location. Implementation-dependent data structures for linking object files and managing memory often contain enough information to allow container location, if the information is processed slightly. The linker does need to know the names and locations of global variables, and the memory allocator needs to know the sizes of any blocks it has allocated, and what memory is not allocated at all. This is not the case for dynamic type checking; in a typical C or C++ implementation, the complete set of types that may be associated with any particular address is unavailable.

The section provides a detailed description of a technique for recovering type and bounds information for C and C++ pointers. The described algorithm and data structures allow an instrumented program to maintain a record of what types and bounds are associated with what addresses, and to query this information for purposes of reporting errors such as RT3 and RT4.

container location

A container corresponds to a region of memory with an associated type, that does not occur within a larger container. Examples of containers include local variables, global variables, memory returned by the malloc library call, and memory returned by the standard implementation of C++ new. Containers do not overlap each other, and the C standard and C++ draft standard do not specify any particular address relationship between any c containers. Each container has an associated outer type. This corresponds to the type either explicitly (by declaration of a local or global variable) or implicitly (by new or certain idioms involving malloc) associated with the container in the source program. The run-time system includes subroutines for registering containers and associating outer types with containers. For efficiency purposes, some operations are combined; for instance, the run-time system includes a routine for allocating memory, registering that memory as a container, and associating a type with that container.

Information about different sorts of containers is stored in different data structures. A map of the entire address space indicates which data structure to consult for pointers addressing within any given page. A page is tagged with one of the following attributes:

Unallocated: There are no containers stored in an unallocated page. There is no outer type to recover, and any pointer to such a page is completely invalid. Note that the run-time system's own data structures are marked as unallocated.

Heap: Memory allocated by malloc or (standard implementation) new. Each call yields a pointer to a separate container. Calls to free or delete unregister containers. The run-time provides its own implementation of malloc and free to make access to these containers as efficient as possible.

Global: Statically allocated storage (global variables and file-scope-static variables) are stored in "global" pages. Each variable is a separate container. In addition, because there is no guarantee that all global variables will be registered with the run-time system, the run-time system attempts to maintain a record of all storage that might contain globals, using implementation-dependent information about the layout of an address space (for instance, calls to load shared libraries are intercepted, and the ".data" and ".bss" sections of each loaded library are recorded), so that allocated-but-unregistered addresses may be recognized as such.

Stack: Local variables (activation records) are stored in "stack" pages. Each local variable is a separate container. Local variables are registered in a two-step process; when a procedure is entered, a table of all the variables that might be active in the execution of that procedure is registered, and as scopes are entered and exited, that table is manipulated to efficiently register and unregister local variables. When the procedure is exited, the entire table is unregistered. The state of the local table is also recorded before executing code that may lead to a non-local transfer of control (before calls to setjmp and before entering C++ try-except blocks) so that it may be restored after a non-local transfer of control. The run-time system also uses implementation-dependent information (where possible) to detect non-local transfers of control in uninstrumented code that might deallocate local variables of instrumented subroutines.

Zero-sized data: The C and C++ standards declare that "zero-sized" memory allocations should yield distinct addresses. However, there is no requirement that the memory be mapped into the address space, since there is no way to dereference it. Pages containing these addresses are marked as zero-sized.

User-controlled: Most C and C++ systems include a variety of ways in which a program may make system-specific and/or low-level calls to obtain memory for its use. Because all of the memory allocated is visible to the user, as are the addresses, the entire block must be regarded as a potential container. Adjacent user-controlled blocks must be merged into a single large container, because the addressing relationships between these blocks are visible (and can be controlled by) the program making the calls.

locating heap containers

For each page of heap-allocated memory (for allocations larger than a page, the first page), the size of containers allocated on that page is recorded. The per-page information also includes a pointer to an array of records of per-container information. Given an address A on the page, the corresponding container and offset within that is found by subtracting the page start address from A to yield a page offset. The page offset is divided by the page's container size to yield the container index (the quotient) and the container offset (the remainder). The container information is obtained by indexing into the per-page array of container records.

locating global variable containers

Information about global and static variables is stored in a "trie" using the address of the variable as a key (for background on "tries" see G. H. Gonnet and R. Baeza-Yates, *Handbook of Algorithms and Data Structures in Pascal and C*, 2d Ed., Addison-Wesley, 1991). This data structure has several useful properties: access to it is not too expensive; it is not dynamically rebalanced, and so fewer locks are needed for error-checking of a multi-threaded program; and greatest-lower-bound and range queries are supported.

locating local variable (stack) containers

Information about local variables is stored in a complex data structure. Given a local (stack) address, the thread owning the stack must be discovered. This is included in the per-page information that identifies the address as being within a stack; each thread is associated with a small integer. The small integer is used as an index into an array of stack headers. Each stack header is in turn threaded onto a list of active stack headers for that thread, where each entry on the list corresponds to a different signal interrupt level that is currently active (these lists are usually short; all stack headers threaded onto it are allocated from the same array). Each stack header contains a pointer to a stack of local variable information tables and parameter/result information blocks, and a small cache of memory blocks used to allow lock-free allocation of stack data structures. Each local variable information table contains an encoding of all the local scopes within the routine, the variables active in those scopes, and the names, types, and addresses of these variables. This information is organized into several arrays. Because the names, types and scope relationships are constant over all activations of the subroutine, a single copy of this array is statically allocated and shared by all activations of this subroutine. Scope relationships are represented by regarding the scopes in the subroutine as a tree, numbering the scopes in source-lexical order, and recording, for each scope S, the number of S's ancestor and the maximum number of all scopes which have S as their ancestor. The statically allocated information is initialized by the instrumentor. The array containing the variable addresses is dynamically allocated, once per subroutine activation, and the addresses are initialized as they become available (as the variables come into scope). The use of the scope tree makes exiting scopes very efficient, and helps make this information robust in the face of partially instrumented code, non-local transfers of control, and limited instrumentation. A single number indicates the desired state of the local variables table, and if a different state is discovered, it is clear which information in the table is ambiguous and must be discarded (the consistent state is the nearest ancestor of the expected and actual scopes; any information for scopes younger than that must be discarded).

type traversal

Figure 6:
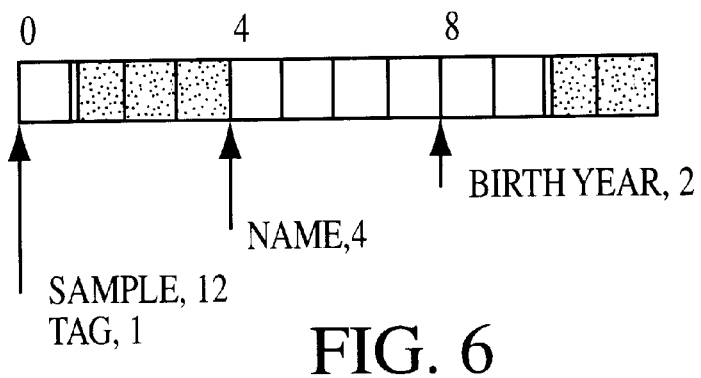
FIG. 6 is a diagram of the memory layout of a C-type struct structure.

The information associated with each container includes the size of the container and the outer type of the container as a whole. However, an address can have more than one type, and the various addresses within a container can have different types. In addition, different types have different bounds, so obtaining accurate bounds on the memory that may sensibly be addressed from a pointer requires matching the declared type of the pointer (in the source program) with the actual type for memory addressed by the pointer. For example, this C type structure:

```
struct sample {
    char tag;
    char * name;
    short birth_year;
}
``` might have the layout in memory shown in FIG. 6 (the exact layout depends on the C compiler).

A pointer referencing the memory at offset zero from the beginning of a container with type struct sample could either address the 12-byte structure (with type struct sample) or else it could reference the one-byte field "tag" which has type char. Any pointer referencing the memory at offsets one, two, or three is not a valid pointer, because in this structure that memory is filled with padding bytes. Offset 4 can only be interpreted as addressing a 4-byte pointer, and offset 8 contains a 2-byte short integer. Offsets 10 and 11 contain padding bytes, which should not be addressed by valid pointers. Note, too, that addresses within multi-byte atomic (pointer, integer) data should also not be explicitly referenced; offsets 5, 6, 7, and 9 do not correspond to valid pointers.

Figure 7:
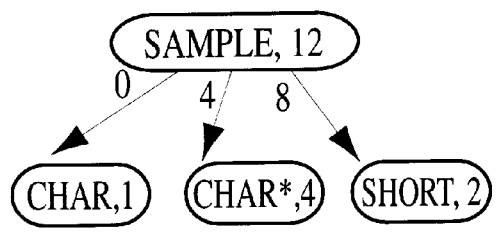
FIG. 7 is a type tree corresponding to the struct structure of FIG. 6.

This data can be described by a tree, in which parent nodes represent structure types, and child nodes represent types contained within the structure types, as shown in FIG. 7.

Figure 8:
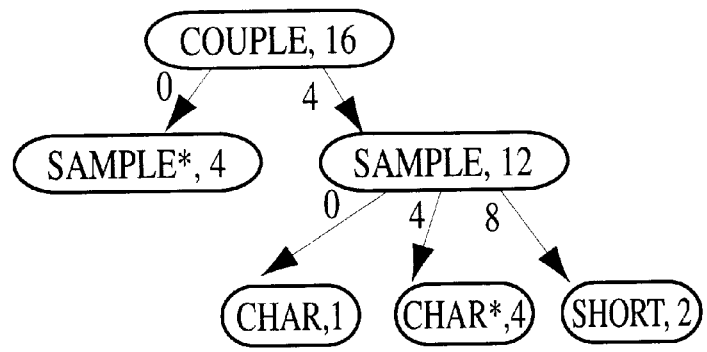
FIG. 8 is a type tree that includes the type tree of FIG. 7 as a child of one of its nodes.

Of course, the child nodes could themselves be structures which contain other types, as shown in FIG. 8.

This suggests an algorithm for determining if an offset O has a type T;

```
match(tree_node N, type T, offset O, base_address B) {
    while (O != zero) {
        if (O >= size(T)) {
            return error;
        }
        C = child of N with largest offset P <= O;
        O = O - P;
        B = B + P;
        N = C;
    }
    while (T does not match N and N has children) {
        N = child of N at offset zero;
    }
    if (T matches N)
        return success, base address B, size of N;
    else
        return error;
}
```

Notice that the subtree node for the second field of a couple, which has type sample, has exactly the same form that it does when it is the root of a tree. This allows the same node to be used whenever the type sample appears. Allocating exactly one node for each type in the program saves space and allows a simple pointer equality test to see if two types are the same. Though the containment relationships among the types may be regarded as forming a set of trees, they are implemented as a directed acyclic graph (DAG).

Figure 9:
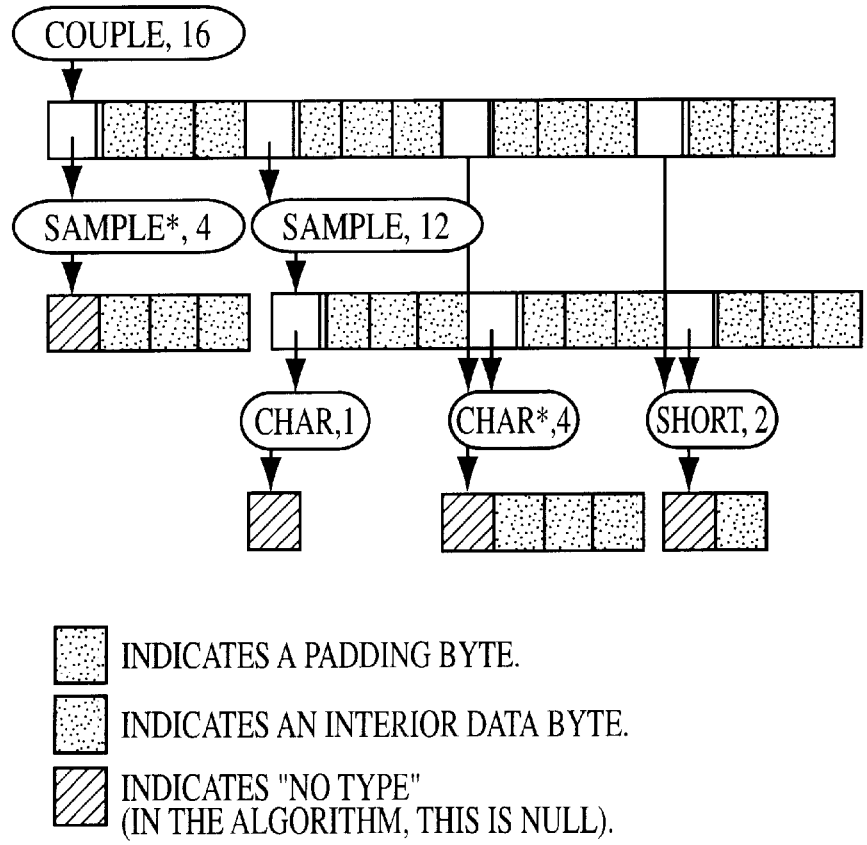
FIG. 9 is a diagram of a flattened type tree corresponding to the type tree of FIG. 8.

The algorithm above can be made faster, at the expense of some space overhead, by flattening the type trees and storing the children and some of the descendants of each node in an array. Because the type DAG contains only one node per type, the space overhead introduced by this optimization is usually not severe. To flatten a subtree rooted at a node N, first flatten all the children of N. Allocate an array A of pointers, containing as many pointers as there are bytes in the type for N. Initialize the elements of the array with a pointer to a special "type" indicating padding bytes. Then, for each child C at offset O, copy C's array into A starting at index O. At index O itself, instead of copying the first (zero offset) entry from C's array, store the pointer to C itself The example tree above would be translated into the form shown in FIG. 9.

Some or all of the other non-type bytes may also be encoded as null. With this modified data structure, the search algorithm now looks like this:

```
match(tree_node N, type T, offset O, base_address B) {
    if (O != zero) {
        N = child of N at offset O;
        B = B + O;
        O = zero;
    }
    while (T does not match N and N not null) {
        N = child of N at offset zero;
    }
    if (T matches N)
        return success, base address B, and size of N;
    else
        return error;
}
```

The data structure and search algorithm described above are what is used for C structures in the invention.

However, not all data structures in C and C++ are structures. Arrays can also contain types, and arrays present the interesting complication that pointers into their interior may reference (through pointer arithmetic) memory at smaller offsets within the array. This is only true for array elements; if a pointer references a field of an array element, then the bounds on that pointer are restricted to that single field. The data structure and search algorithm described above can be augmented to accommodate arrays that are fields within structures (that is, array types that are contained within structure types; such arrays are called internal arrays here).

To do this, the flattened representation is maintained, but an additional sort of type node is added, and certain entries in the array are specially tagged. Suppose that these C types appear in a program:

```
struct coord {
    char x,y;
};
struct path {
    struct coord c[3];
    short length;
};
```

Figure 10:
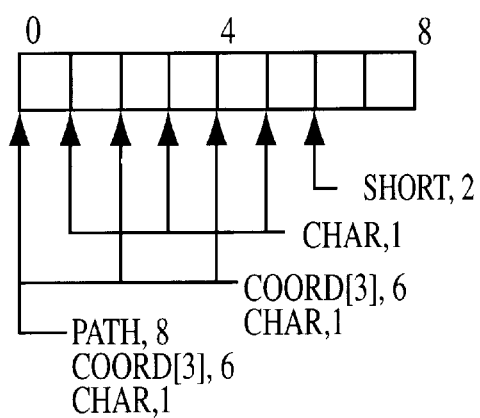
FIG. 10 is a diagram of a memory layout of a C-type struct path structure.

The storage layout for a struct path might appear as shown in FIG. 10.

A pointer addressing offset zero within such a type might legally reference either a path, or an array of 3 coord, or a single coord, or a char. Pointers addressing offsets two or four also reference memory with type coord, but because the reference items are elements of a larger array, and because C allows pointer arithmetic within array bounds, the base address for either of them lies at offset zero, and their extent is the extent of the entire array (which is smaller than the extent of the structure which contains the array here). If, however, a pointer addressing offset two or four is declared to reference characters (C type char*), then the storage addressed by the pointer is limited to the character itself, and no pointer arithmetic is possible. Offsets one, three, and five can only reference characters. A modification to the data structures and algorithm presented thus far captures these features of the C type system.

A new sort of node is used in the tree encoding the layout of this type, and the array of children is modified to link array elements to the array type. The additional node is an "internal array" node; its single child is the node for the array element type, and it includes the size of the entire array. An internal array node has a one-element array containing its single child.

Figure 11:
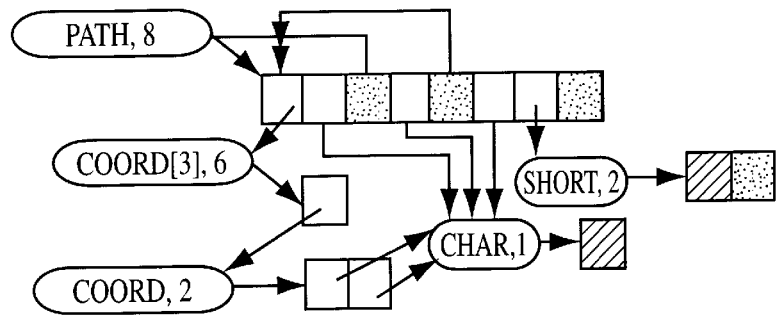
FIG. 11 is a diagram of a type tree corresponding to the C-type struct path structure of FIG. 10.

When a structure T has a field whose type is U[N] (that is, N copies of the element type U), the array of children attached to T's type node is initialized in a different way. The internal array type node (the child of T in the type tree) has no array to copy; instead, N copies of U's child array are copied into T's child array. For each element's copy, the entry at offset zero is modified. Offset zero of the first (index zero) element contains a pointer to the internal array type node. Offset zero of each subsequent element contains an encoding of the difference between the start of the array and the element's address (a negative number). In the present implementation, the least significant bit of all pointers in the child array is known to be zero, so the presence of an integer is indicated by setting that bit and storing the integer value in the remaining bits of the word (that is, the actual value stored is two times the integer, plus one). For instance, the integer -2 would be encoded as -3. For a struct path, the type tree appears as shown in FIG. 11.

The effects of various type checks can be traced in this diagram. At offsets one, three, and five, a pointer to a char will eventually arrive at the char node in the usual way, with its associated size of one. At offset zero, a check for char type also succeeds after traversing nodes for path, coord[3], and coord. At offsets 2 and 4, however, the difference entry in the array must be treated specially, and then the search continues as if it had started at offset zero.

Figure 12:
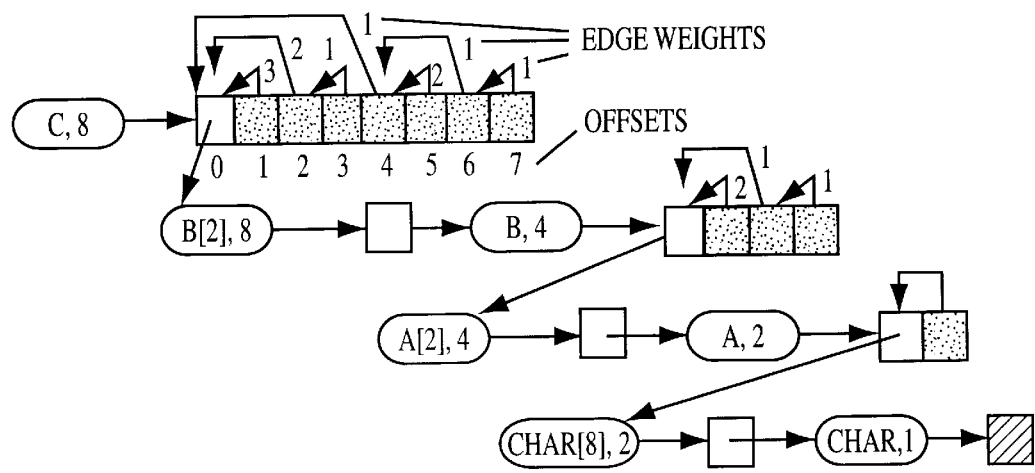
FIG. 12 is a diagram of a type tree corresponding to a set of C-type struct structures.

A check for type coord is more interesting. The array type itself does not match a coord (using the pointer equality check for the type node), so the search will not succeed until the node for coord is reached. If that result is used, the bounds returned will be wrong, they will limit access to a single coord, instead of the entire array. Note, however, that the parent of the matching node is an internal array node. Whenever this is the case, the extent for the match can be taken from the array type, and not the element. The special treatment of difference entries has already adjusted the base. The parent node is recorded by keeping track of the previous node visited within the search loop. There is also an additional difficulty presented by multiply nested arrays of structures. Consider this example:

```
struct a {
    char z[2];
};
struct b {
    struct a y[2];
}
struct c {
    struct b x[2];
}
``` and the corresponding trees built according to the rules described above as shown in FIG. 12.

A check to see if offset seven is a character should return a lower bound of six and an extent of two. In addition, any check to see if offset seven is an a, b, or c, should return failure. Both of these things should also be true of offset one. This implies a somewhat tricky traversal; it is not sufficient to simply step backwards through the encoded integers, starting the search at the first type pointer encountered. Here, for instance, that might well yield the wrong bounds, and it would also allow casts to a, b, or c to succeed. It is necessary to keep track of how many encoded offsets are traversed, and to give each offset a "weight" when the type data structures are built. It is still practical to encode all this information within a single machine word, because most types are small, and those that are not can be encoded using a different representation. This is a reasonable restriction because this encoding is fast for the common case (small types) and consumes an unreasonable amount for memory for the larger cases.

The encoding of offsets and weights used in this algorithm is expressed as several macros, both to make the code more readable and to allow easy change of the encoding if it should be necessary. C-style macro definitions are used, since C-style pseudocode is used to describe the algorithms:

```
#define encode(off,weight) ((off)<<8+(weight<<1)+1)
#define is_encoded(X) (((X)&1) != 0)
#define offsetof(X) (((int) (X))>>8)
#define weightof(X) (((unsigned int) (X & 255)) >> 1)
#define max_weight 127
#define increment(X) ((X)+((X)<max_weight ? 1 : 0))
```

Offsets are signed (actually, they are always negative), weights are unsigned. The range of values permitted for weights is much larger than necessary because single-element arrays are not treated as arrays (since any C scalar variable may be treated as a single-element array, any single-element array is treated as if it were a scalar variable); overflowing that field would require a type with $2^{127}$ elements. Even if there were an overflow, the failure is "soft", in that certain errors will fail to be reported, rather than the algorithm crashing, or reporting a spurious error. It is very likely that as few as three bits would be sufficient for all practical purposes.

This initialization is also embedded within a larger initialization that ensures that all field types are initialized before their container; that is, types are initialized in topological order. The input to the initialization is a more conventional representation of a C structure type; each structure has an associated array of fields, and each field has an associated scalar or element type and an element count. The element count is one if the field is either a single-element array or a C scalar. Multi-dimensional arrays are "flattened" and treated as if they were a single-dimensional array with the same dimension as the product of the dimensions of the multi-dimensional array. This follows typical C and Fortran practice.

```
which_byte = 0;
child_array = array allocated to hold children of this type;
for (which_field = 0; which_field < field_court;
    which_field++) {
    field_type = type node for which_field elements;
    field_count = number of elements in array, 1 not
        array;
    field_size = size of elements of which_field;
    field_array = child array from field_type;
    for ( index = 0; index < field_count; index++) {
        for ( byte = 0; byte < field_size; byte++) {
            X = field_array[byte];
            if (byte == 0) {
                if (index == 0) {
                    if (field_count == 1) {
                        /* Copy node */
                        child_array[which_byte] =
                            X;
                    } else {
                        /* Internal array node */
                        child_array[which_byte] =
                            internal_array_node(
                                field_type,
                                field_count,
                                field_size);
                    }
                } else {
                    /*Encode difference, weight 1*/
                    child_array[which_byte] =
                        encode (-index*field_size,
                            1);
                }
            } else {
                if (is_encoded(X) && field_count > 1
                    &&
                    index == 0) {
                    O = offsetof (X);
                    if (O + byte == zero) {
                        /* Increment weight */
                        child_array[which_byte] =
                            encode (O,
                                increment (X));
                    } else {
                        /* Copy node */
                        child_array[which_byte] =
                            X;
                    }
                } else {
                    /* Copy node */
                    child_array[which_byte] = X;
                }
            }
        }
    }
}
```

```
            which_byte = which_byte + 1;
    } /*byte*/    } /*index*/    } /*which_field*/
```

Here is the modified search algorithm which yields the correct behavior.

```
match(tree_node N, type T, offset O, base_address B)
{
    if (O != zero) {
        X = entry in N' s child array at offset O;
        if (is_encoded(X)) {
            /* X is encoded difference */
            int depth = weightof(X);
            O = O + offsetof(X);
            Y = child of N at offset O;
            B = B + O;
            while (integer value of Y is odd) {
                /* Each iteration corresponds to
                   an additional level of array
                   + struct nesting. */
                O = O + offsetof(Y);
                depth = depth + weightof(Y);
                Y = child of N at offset O;
            }
            N = Y;
            while (true) {
                if (N is internal array type)
                    depth = depth - 1;
                if (depth == 0) break;
                N = child of N at offset zero;
            }
        } else {
            /* X is child pointer */
            N = X;
            B = B + O;
            O = zero;
        }
    }
    oldN = N;
    while (T does not match N and N not null) {
        oldN = N;
        N = child of N at offset zero;
    }
    if (T matches N)
        if (oldN is an internal array type)
            return success, base B, and size of
                oldN;
        else
            return success, base B, and size of
                N;
    else
        return error;
}
```

Now consider verifying that a character is stored at offset seven.

Initially, O=7 and B=0 (in practice, B is not zero, but a correct result can be verified if the resulting base is 6).
Line 2: O is not zero.
Line 3: X=contents of cell #7 (encoding for −1)
Line 4: X is odd.
Line 6: depth=1.
Line 7: O=6 (6=7+−1)
Line 8: Y=contents of cell #6 (encoding for −2)
Line 9: B=6 (6=0+6)
Line 10: Y is odd.
Line 14: O=4 (4=6+−2)
Line 15: depth=2
Line 16: Y=contents of cell #4 (encoding for −4)
Line 10: Y is odd.
Line 14: O=0 (0=4+−4)
Line 15: depth=3

Line 16: Y=contents of cell #0 (contents=pointer to "b[2]" cell)
Line 10: Y is even (pointers are even)
Line 18: N=Y
Line 19: condition is (literally) true.
Line 20: true, so depth=2;
Line 21: false.
Line 22: N=child at offset zero (contents=pointer to "b" cell)
Line 20: false;
Line 21: false;
Line 22: N=child at offset zero (contents=pointer to "a[2]" cell)
Line 20: true, so depth=1;
Line 21: false
Line 22: N=child at offset zero (contents=pointer to "a" cell)
Line 20: false:
Line 21: false
Line 22: N=child at offset zero (contents=pointer to "char[2]" cell)
Line 20: true, so depth=0;
Line 21: true, break and exit loop.
Line 32: oldN=N (N="char[2]")
Line 33: condition is true
Line 34: oldN=N;
Line 35: N="char"
Line 36: condition is false (false="char" not matches "char")
Line 37: condition is true (true="char" matches "char")
Line 38: condition is true ("char[2]" is an internal array type)
Line 39: return success, B=6, size=2.

Note how the loop at line 19 starts the actual type checking sufficiently deep in the tree that an attempted cast to a, b, or c would fail. Each encoded difference traversed corresponds to a level of nesting by some number of structures and at least one array.

Checking the type from offset one would only traverse a single encoded difference, but the weight on that edge is three, so the actual type checking would start at the same place in the tree.

Arrays are not necessarily nested within structures. "External" arrays are represented differently because (in practice) they are often much larger than C structure types, because there can be a great variety in the different sizes that are allocated, and because the bounds are not known at compile time.

External arrays are represented by a different sort of type node that contains information about the element size, element type, and total extent of the array. The check for an external array occurs before the check for structures and internal arrays. It is relatively straightforward:

```
match(tree_node N, type T, offset O, base_address B) {
    if (N is external array) {
        R = O modulo N' s element size;
        E = N' s element type;
        if (R == 0 && T matches E) {
            return success, base B, N' s extent.
        } else {
            B = B + O - R;
            O = R;
            N = E;
        }
    }
    /* Continue with usual algorithm */
    ...
}
```

The check for "N is external array" is combined with a bound checks on the offset O to improve performance.

C also contains union types. The run time system contains code that allows it to accurately track the last type stored in a union, but in practice unions are so often used in a technically non-standard way that these checks are not useful. The implementation of this detailed check is not described here (it appears in the source code, and is a cause of substantial complexity). Instead, the prelinking phase generates type descriptions in which all offsets corresponding to unions have been replaced with a special "ignore any error" node.

The run time system contains additional features not detailed here. It detects certain non-standard type idioms, including:

1) structures with extended trailing arrays. The bound of the trailing array should include the extra memory allocated for it. This is detected automatically.

2) casting to a structure whose type layout is a prefix of the actual type layout. This event should be reported once for each pair of types where it occurs, but not more often than that (it will not cause a program to crash, it is common practice, and it is relatively portable across popular C implementations).

3) casting to an incomplete type that is multiply-defined. Here, if one of the multiple definitions results in a valid cast, then that one should be chosen, and no error reported. Note that if this occurs the prelinker must have reported a violation of the One Definition Rule.

4) casting to a technically different but structurally similar version of the same type (that is, a cast across a weak violation of the One Definition Rule). This may not be portable, but it won't cause a crash on this particular platform, and the prelinker has already reported an error. This diagnostic is reported as less severe than a cast between types that are not structurally similar.

Handling C++ types requires a few minor additions to the type-checking described above. Reducing C++ types to maps from offset to type nodes results in a considerable simplification. Ordinary (non-virtual) base classes are treated just like fields; a range of memory in the derived class can also be interpreted as referencing the base class, just as if it were a field. Changes are necessary to deal with virtual base classes.

If a class C has a virtual base class V, from the run-time system's view it is as if there were two types, C-exact and C-inexact. C-exact corresponds to memory that is exactly a C; it is not some class derived from C. This means that the location of the virtual base class is known. C-inexact corresponds to memory that is either C or some class D derived from C. In that case, the derived class may also inherit from some other class which has V as a virtual base, and this will affect the location of V within C, because the two classes inheriting from V must share a single instance. That is, the layout for C-inexact does not include any virtual base classes, because their location varies depending upon the structure of the class inheriting from C.

When casts are performed, the instrumenter must use the inexact type for checking purposes, because that is all that can be guaranteed (a cast to the exact type might fail if the actual type was derived from it). However, if the exact type is discovered, that should determine the bounds. This adds an additional bit of backtracking to the type traversal. And, of course, if the type is exact, it could also be an array element, which requires further backtracking. Here is the relevant code from the original algorithm, in both before (C-only) and after (support for C++ virtual base classes) form:

Original Version (C only)

```
oldN = N;
while (T does not match N and N not null) }
    oldN = N;
    N = child of N at offset zero;
}
if (T matches N)
    if (oldN is an internal array type)
        return success, base B, and size of
            oldN;
    else
        return success, base B, and size of
            N;
else
    return error;
}
```

This version handles exact and inexact types. A type node that corresponds to an inexact type contains a pointer to the node corresponding to its exact type.

Enhanced Version (C++ support)

```
oldN = N;
olderN = N;
while (T does not match N and N not null) {
    olderN = oldN;
    oldN = N;
    N = child of N at offset zero;
}
if (T matches N)
    if (N' s exact type == oldN) {
        if (olderN is an internal array type)
            return success, base B, size of
                olderN;
        else
            return success, base B, size of
                oldN;
    }
    else if (oldN is an internal array type)
        return success, base B, and size of
            oldN;
    else
        return success, base B, and size of
            N;
else
    return error;
}
```

Figure 13:
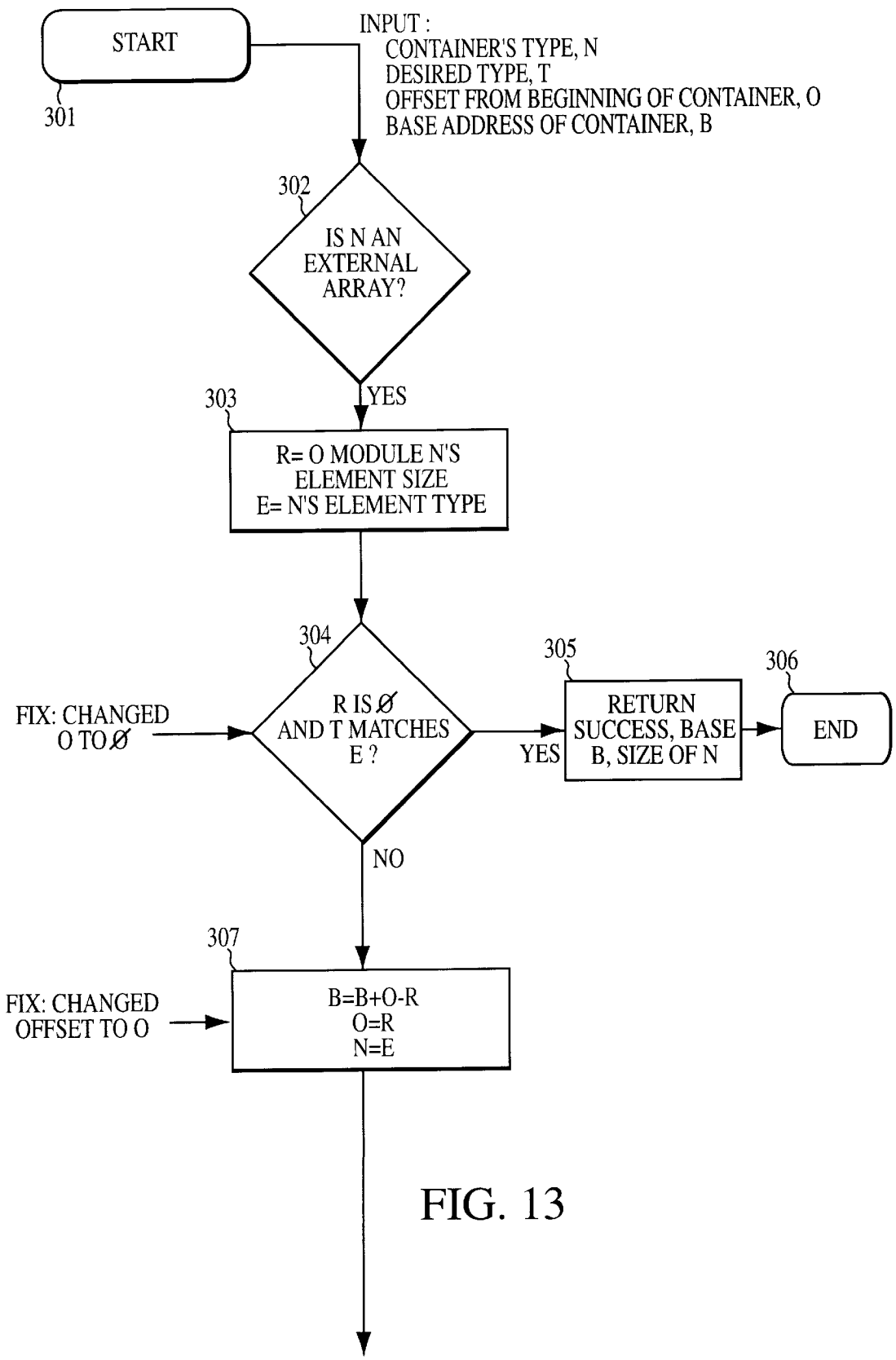
FIGS. 13–C are a flowchart of the step:, for type and bounds recovery for C and C++ pointers in accordance with the invention.
Figure 13A:
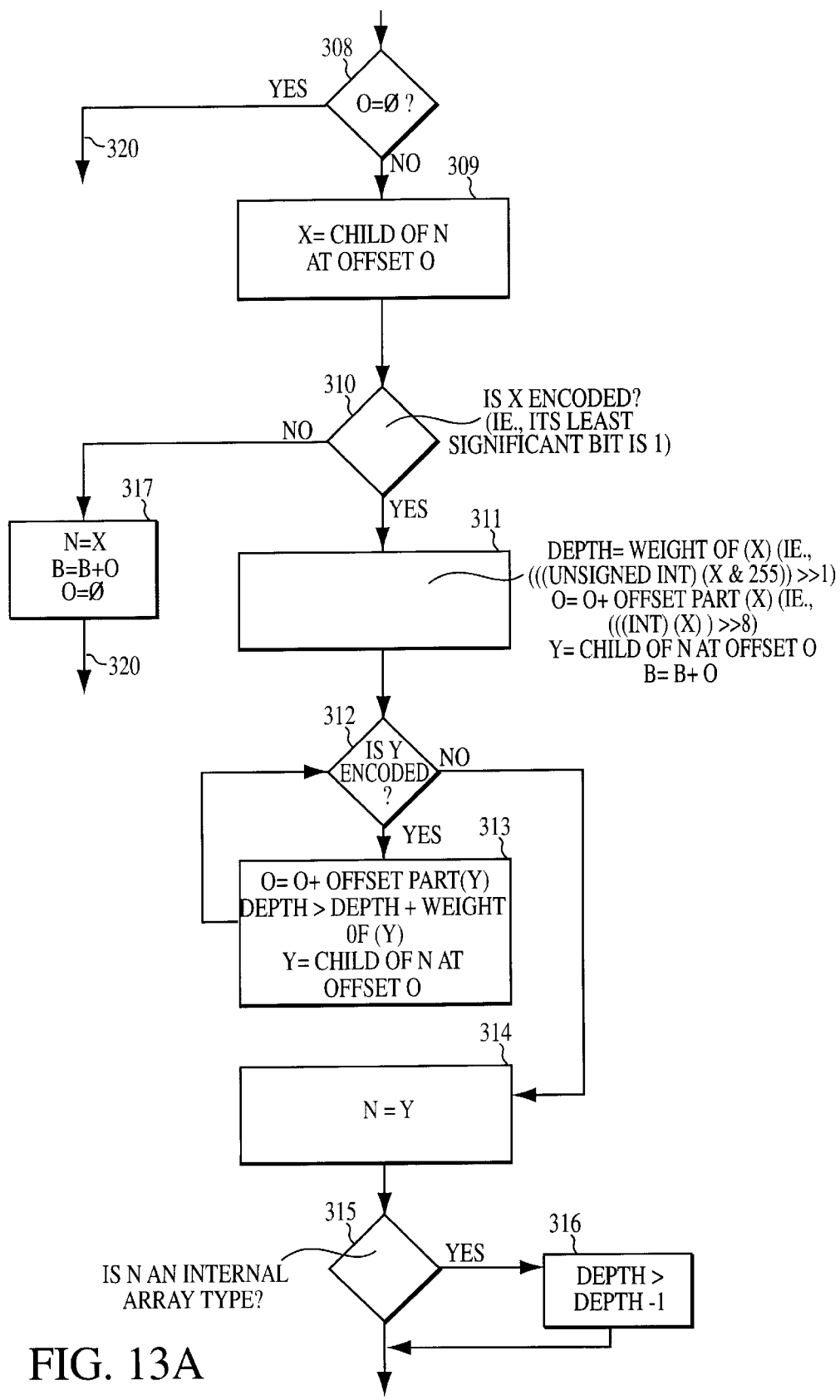
Figure 13B:
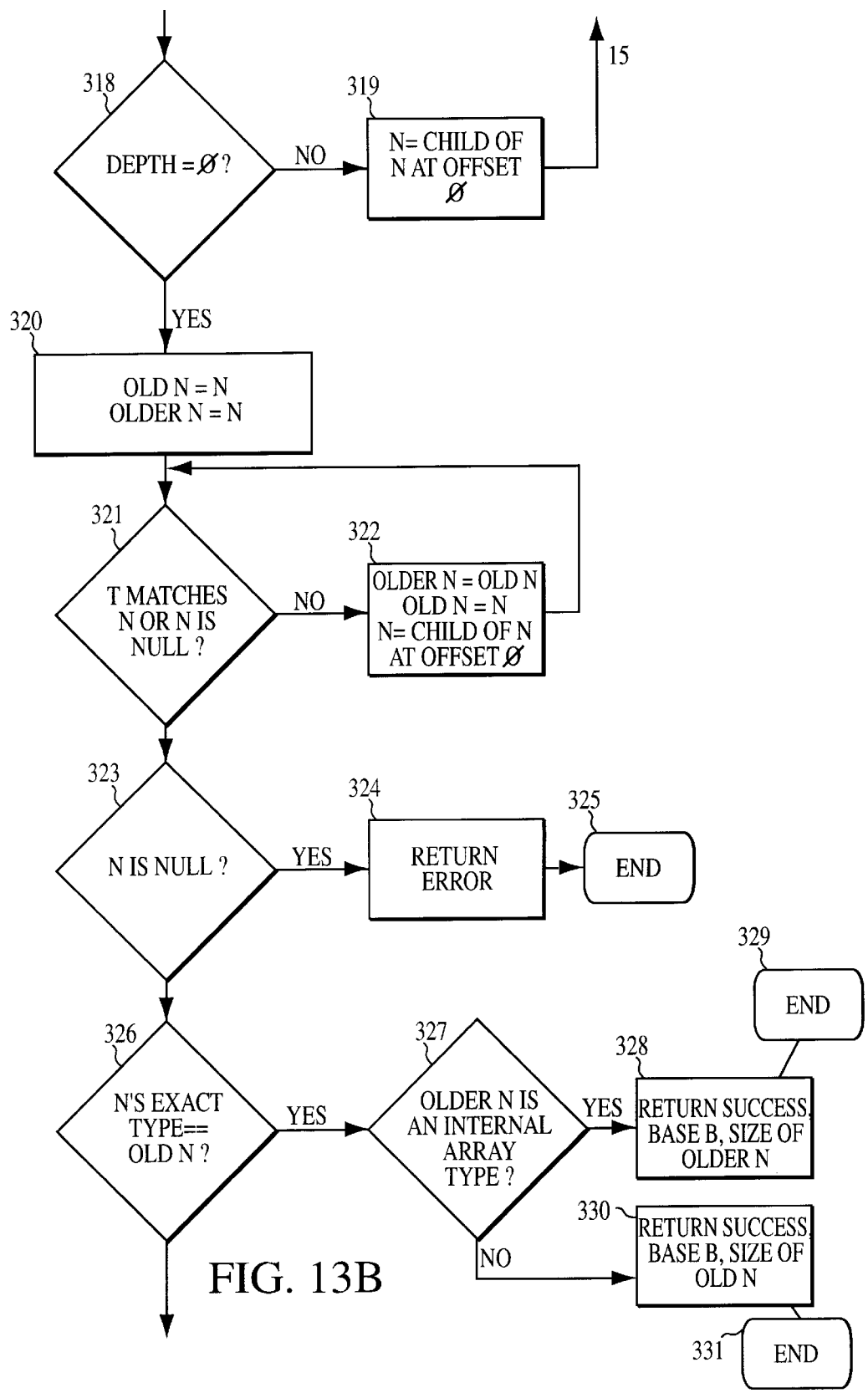
Figure 13C:
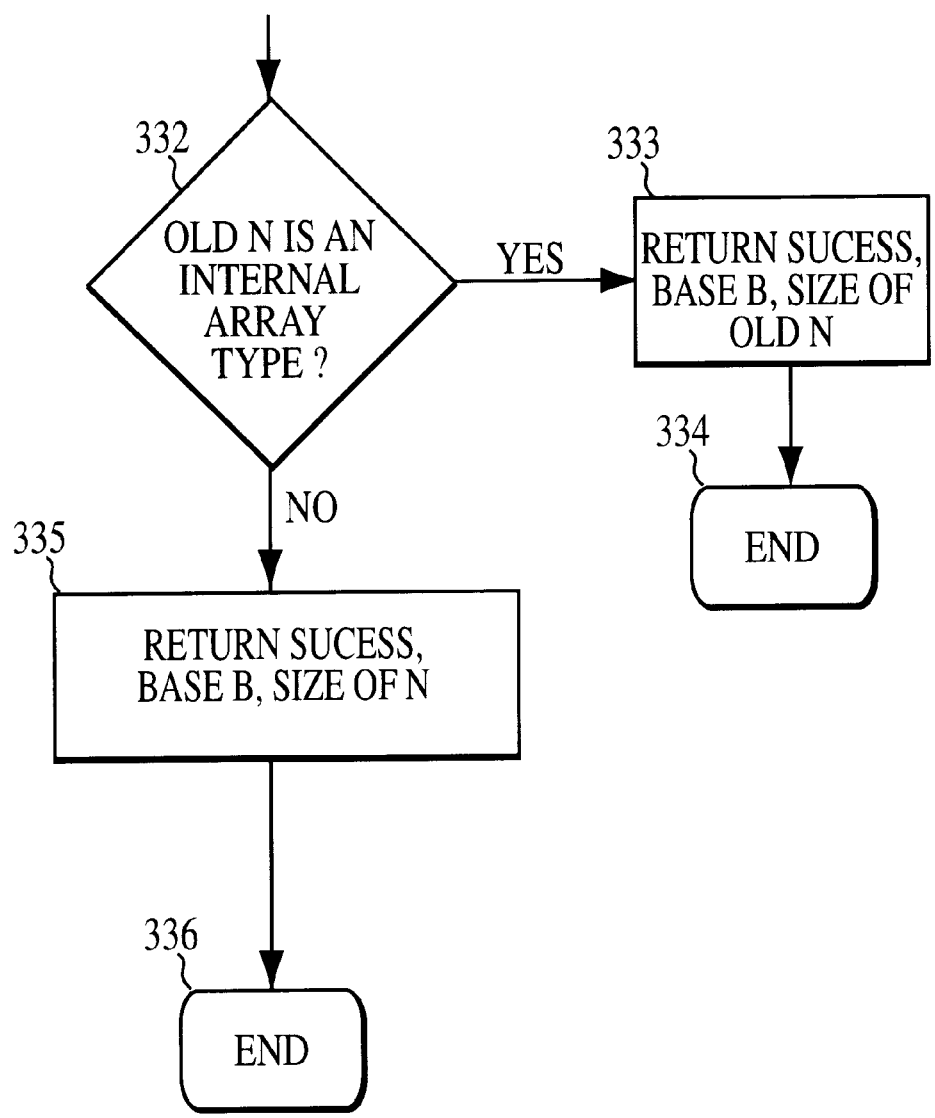

FIGS. 13–13C are a flowchart of the steps for type and bounds recovery for C and C++ pointers in accordance with the invention. More specifically, steps 301–336 correspond to the modified search algorithm set forth above for determining whether an offset O within a container N having base address B has a type T, where container N can be either a structure of an array.

Detailed Description of Instrumentation Technique

Figure 14:
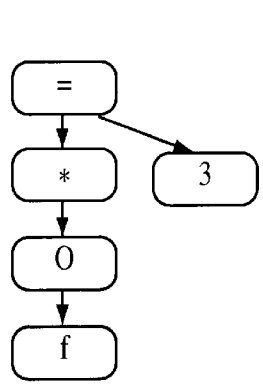
FIG. 14 is a syntax tree corresponding to a fragment of C++ code.

A traditional syntax tree is a tree in which nodes represent operations, and child subtrees represent arguments to those operations. A fragment of C++ code is shown below, and a typical syntax tree for this fragment is shown in FIG. 14:

```
int* f ();
void g()
{
    *f() = 3;
}
```

A frequent mistake in C++ is the dereferencing of pointers that are NULL. Thus, a useful instrumentor for run-time error detection might add code to check that a pointer was non-NULL before every dereference. The code for the body of g might be transformed to look like:

```
void g()
{
    int* temp;
    (nullcheck(temp = f()), *temp) = 3;
}
```

Note that the resulting code has the exact same effect as the original, except that it also calls nullcheck( ), which checks the value of the pointer returned by f( ) and reports an error condition if it is NULL. (The introduction of the temporary is necessary to prevent f( ), which may have side-effects, from being called twice.)

Figure 15:
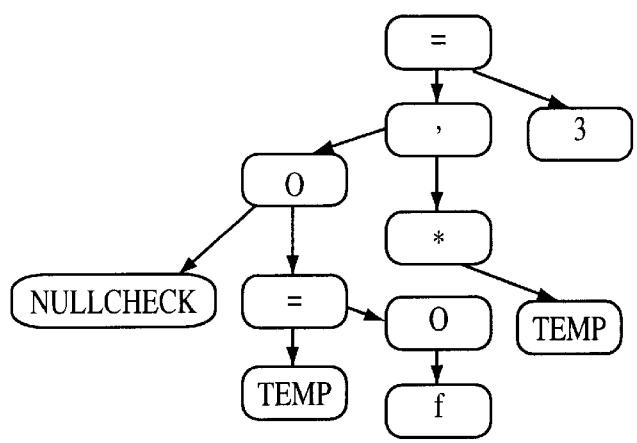
FIG. 15 is a transformed version of the syntax tree of FIG. 14 corresponding to a fragment of C++ code instrumented to check that a pointer was non-NULL before every dereference.

It is important that the instrumentor not transform the syntax tree destructively as shown in FIG. 15.

In particular, consider the situation in which two different kinds of instrumentation are applied to a single piece of C++ source code, for example instrumentation for run-time error checking, as in the example above, together with instrumentation for code coverage analysis. Adding a second kind of instrumentation can involve interactions between the two kinds of instrumentation, if the instrumentation is implemented in the manner discussed above.

As an example of a second independent instrumentation, one might wish to keep track of the caller and callee every time a function call is made, to track control-flow through the program. To this end, the instrumentation phase would add a call to the function pointed to by report\_function\_ call with the names of the caller and callee (the use of a function pointer rather than a fixed function allows user code to change the reporting function as the program runs). So, after instrumentation, the original code fragment might become:

```
void (*report_function_call) (char* caller, char* callee);
void g()
{
    *((*report_function_call) ("f", "g"), f()) = 3;
}
```

Now, imagine both kinds of instrumentation were to be combined in a single instrumentor so that it resulting executable program executes both instrumentations together with the code from the original source. If instrumentation for pointer dereferencing occurs first, an additional function call node is introduced into the syntax tree, which causes the control-flow instrumentation to report a function call the user did not write. And, instrumentation for control-flow occurs first, another pointer dereference node is introduced, meaning that additional code will be added to check a pointer dereference that the user did not write.

Note that in order to perform a second, independent instrumentation of the same program, it is important to be able to identify the original tree.

This section describes how a syntax-tree annotation technique according to the invention provides a means to implement instrumentation of programs written in C and C++. Expression annotations are a mechanism for recording what transformations are required without actually performing them until a later canonicalization phase.

clones

Often, the code inserted by instrumentation reuses expressions originally appearing in the users program. A special kind of expression node, called a "clone-expression," is used to represent the re-use of an expression in a different context. The value of a clone-expression is the value of the expression it s cloning (called the "cloned-expression"), but there is an additional important semantic constraint: if the cloned-expression has side effects, then those side effects will only be executed once (this will be insured by a canonicalization phase, which will arrange to save the value of the cloned-expression in a temporary, and reuse the saved value for subsequent uses of the cloned-expression).

In the drawings, a rectangular node with the label "clone" denotes a clone-expression; the expression it points to is the expression which it clones. Clone-expression nodes inherently change a syntax tree into a directed a-cyclic graph, or DAG, because the expression pointed to by a clone expression has more than one incoming edge: the original edge, plus the edges introduced by any clone expressions (one or more clone-expressions can reference a single cloned-expression).

Here is an example of a syntax tree, now a DAG that contains a clone-expression; this example illustrates the same instrumentation as from FIG. 15. Again, a check is performed to ensure the pointer returned by f( ) is valid, before the dereference (*)operation is performed. To perform the instrumentation, a comma operator node is inserted between the assignment operator and its first operand, and make the first operand of the new comma operator be a call to the run-time error checking function called nullcheck. The single argument to the nullcheck function is a clone-expression whose value is the result of the call to f( ), as shown in FIG. 16.

Figure 16:
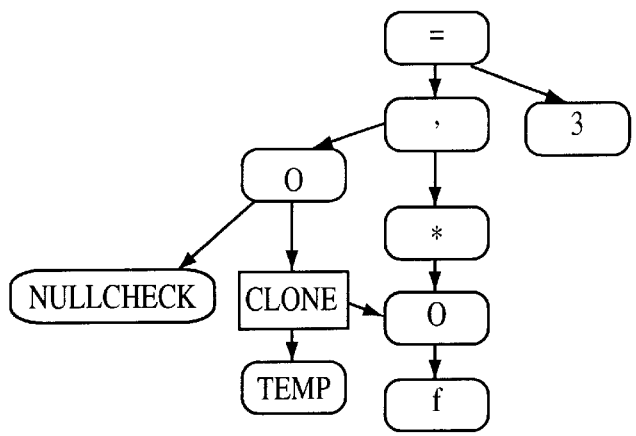
FIG. 16 is another transformed version of the syntax tree of FIG. 14 instrumented according to the invention using a clone-expression.

This syntax tree (now really a DAG) is once again equivalent to the C++ code-fragment:

(nullcheck(temp=f( )), *temp=3 instead of directly performing the instrumentation as in FIG. 16, a list of "pre-expressions" and "post-expressions" is recorded in an expression node that indicate expressions that should be evaluated before and after, respectively, the expression in the node itself. The value of the expression node, however, is still its original value. These pre-expressions and post-expressions can contain clone-expressions.

A pre-expression is notated by drawing a horizontal line with the label "pre" from the annotated node leftward toward the annotation. Similarly, a post-expression (none are represented in FIG. 16) would be represented by a line with the label "post" emanating rightward from the annotated node toward the post-expression.

Figure 17:
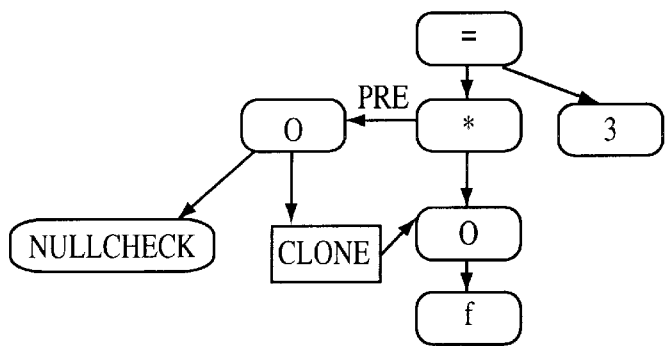
FIG. 17 is another transformed version of the syntax tree of FIG. 14 instrumented according to the invention using a clone-expression and a pre-expression.

FIG. 17 shows the previous example of run-time error checking instrumentation, this time using a pre-expression to describe the instrumentation.

Notice that the original tree is left entirely intact, that is, if one ignores the annotation edges, the tree appears completely unmodified. This is an important advantage of the implementation of the invention described above.

Of course, a traditional back-end processor (whether that back end processor is a preexisting optimizer or machine code generator or byte code generator or source code generator or other process that takes a syntax tree as input) does not understand clones or pre- or post-expression annotations, since they are not part of the original intermediate language that describes syntax trees. In order to be able to reuse a preexisting back-end processor, it is extremely convenient to transform the annotated syntax tree into a syntax tree using only those node and edge types that the preexisting back end processor understands which are the node types in the original syntax tree definition.

Therefore, after an expression has been completely instrumented (that is, after all of the independent instrumentation phases have finished adding pre-expressions and post-expressions), the expression is "canonicalized." This process transforms the annotated syntax tree into an equivalent syntax tree with no clone-expressions and no annotation-expressions.

Canonicalization is accomplished with a pre-order traversal of the expression tree, where pre-expressions and sub-expressions are visited before the node itself, and post-expressions are visited afterwards.

When a clone expression is encountered in the traversal, a check is performed to see whether the expression it is cloning has already been canonicalized. If so, the cloned-expression is transformed to copy its value into a temporary, and replace the clone-expression with a reference to the temporary. If, however, the clone-expression is visited before the cloned-expression is canonicalized, the clone-expression and the cloned-expression are swapped. Then, the process proceeds as before, assigning the result into a temporary, and replacing the original cloned-expression with the reference to the temporary.

Pre- and post-expressions are gathered up into comma-expressions after they have been canonicalized, and appended to the node they annotated. In general, a node with pre-expressions and post-expressions looks like (pre-expressions, temp=node, post-expressions, temp)

after canonicalization.

In the example discussed above, canonicalization of the annotated tree in FIG. 17 would result in the same unannotated tree described in FIG. 15.

Note that the canonicalized syntax tree could have been written in the original source language; this is an important benefit, because it allows for an implementation where the back-end processor generates code in the original source language.

Additional complexity arises in C++, because one cannot, in general, create temporaries of class type. (Their constructors might be inaccessible, or they might have no copy constructors. In addition, copy constructors may execute arbitrary code, and instrumenting compilers wish to preserve the meaning of the source program as closely as possible.) Therefore, the implementation of the invention described above never results in the creation of additional objects of class type. It is assumed that the manipulations performed by the instrumenting code are designed not to change the values of program elements, since doing so might change the program's behavior. Therefore, a pointer to the original class object is used, rather than making a copy to the actual class object.

In addition, the fact that an expression's pre-expressions and post-expressions may contain clones of the expression itself adds considerably to the complexity involved. When canonicalizing a node the algorithm described here is followed. First, a check is performed to see if the node has pre-expressions. If so, the first such pre-expression is unlinked from the node, and then canonicalized as described above. Then, the next pre-expression is unlinked and canonicalized. When the pre-expressions are exhausted, the ordinary children of the node are canonicalized. Finally, the post-expressions are canonicalized in a manner similar to the pre-expressions. Since each pre- or post-expression is unlinked before it is canonicalized, infinite regress is avoided.

Figure 18:
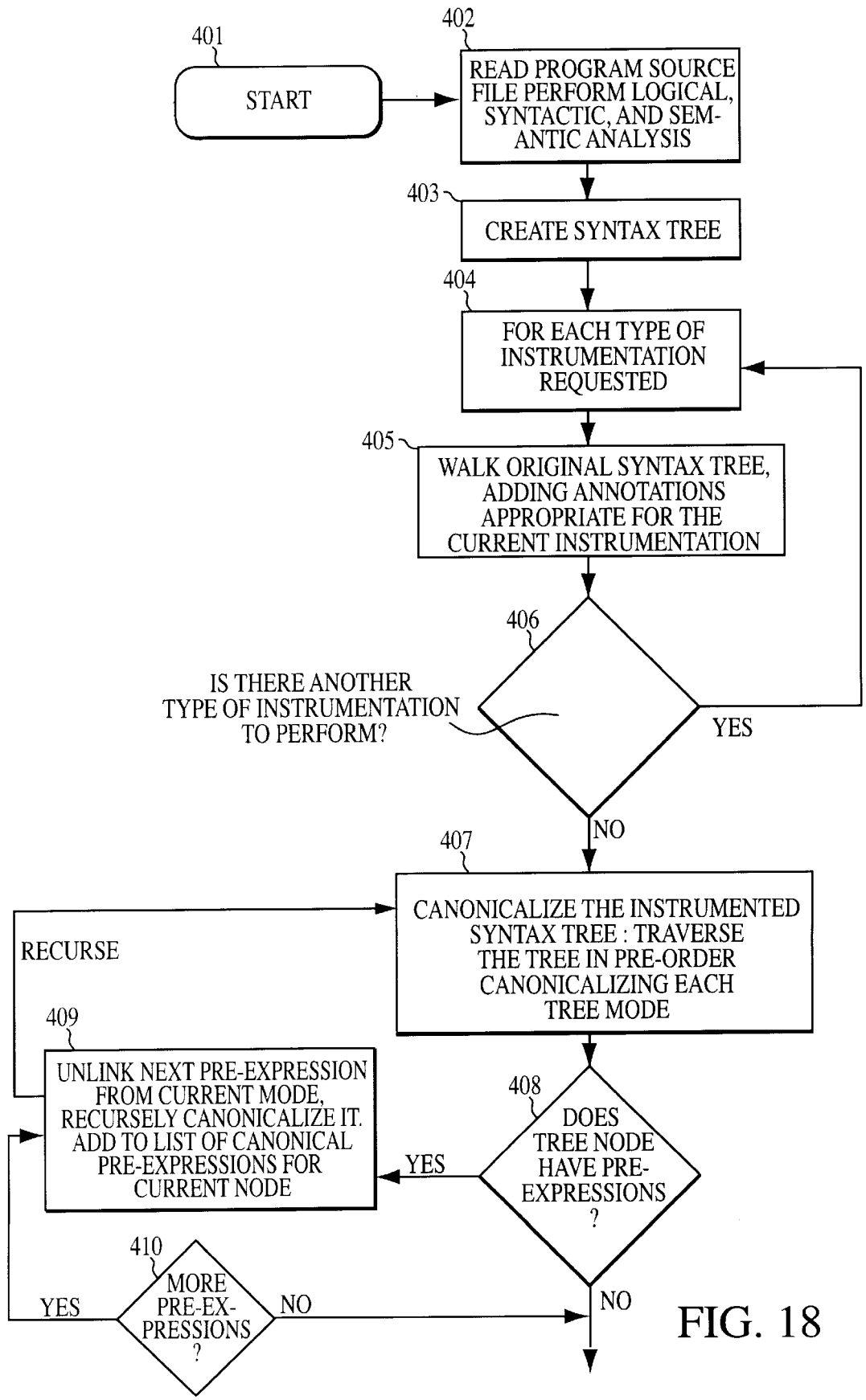
FIGS. 18–18D are a flowchart of the instrumentation technique in accordance with the invention.
Figure 18A:
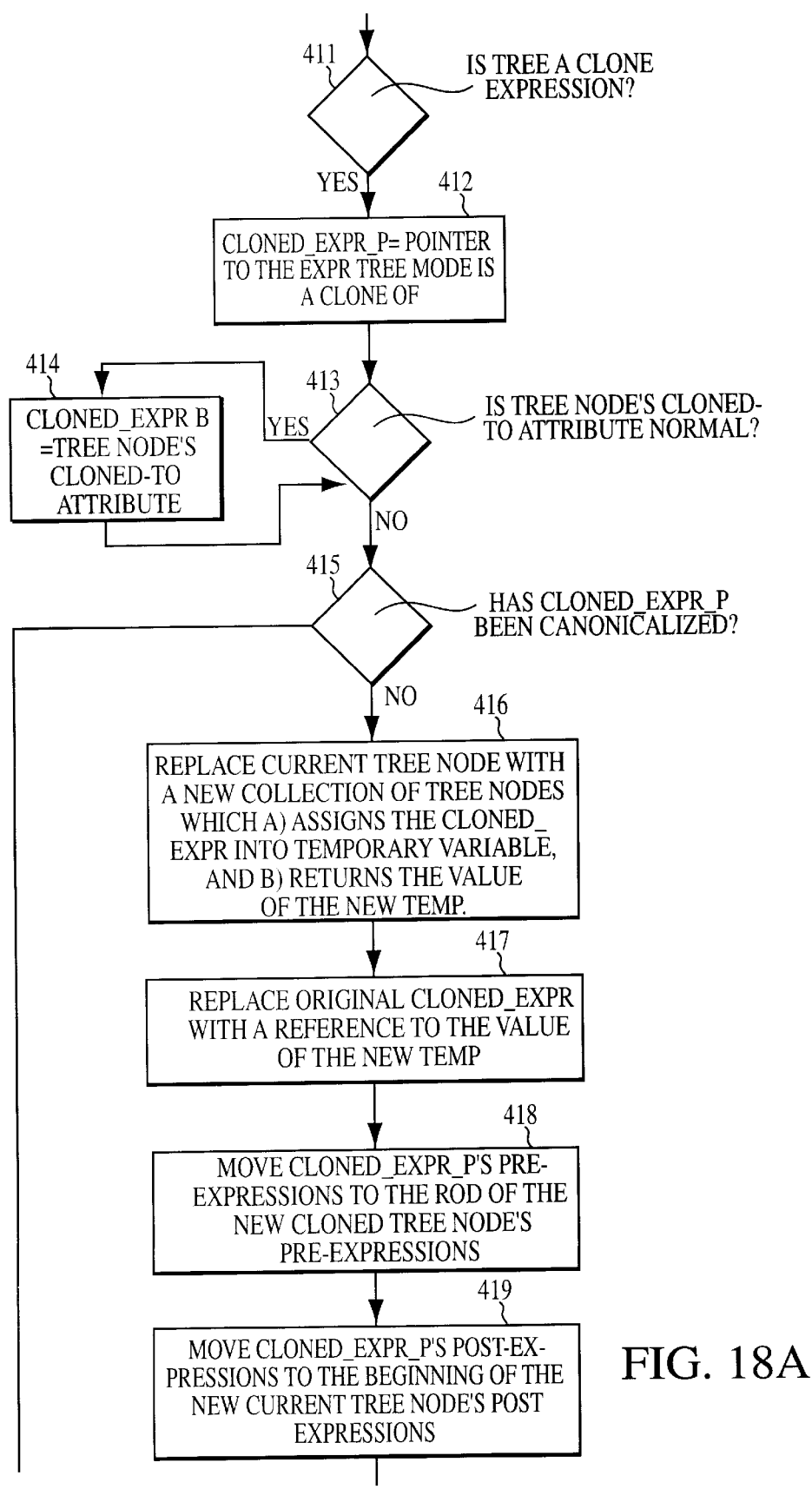
Figure 18B:
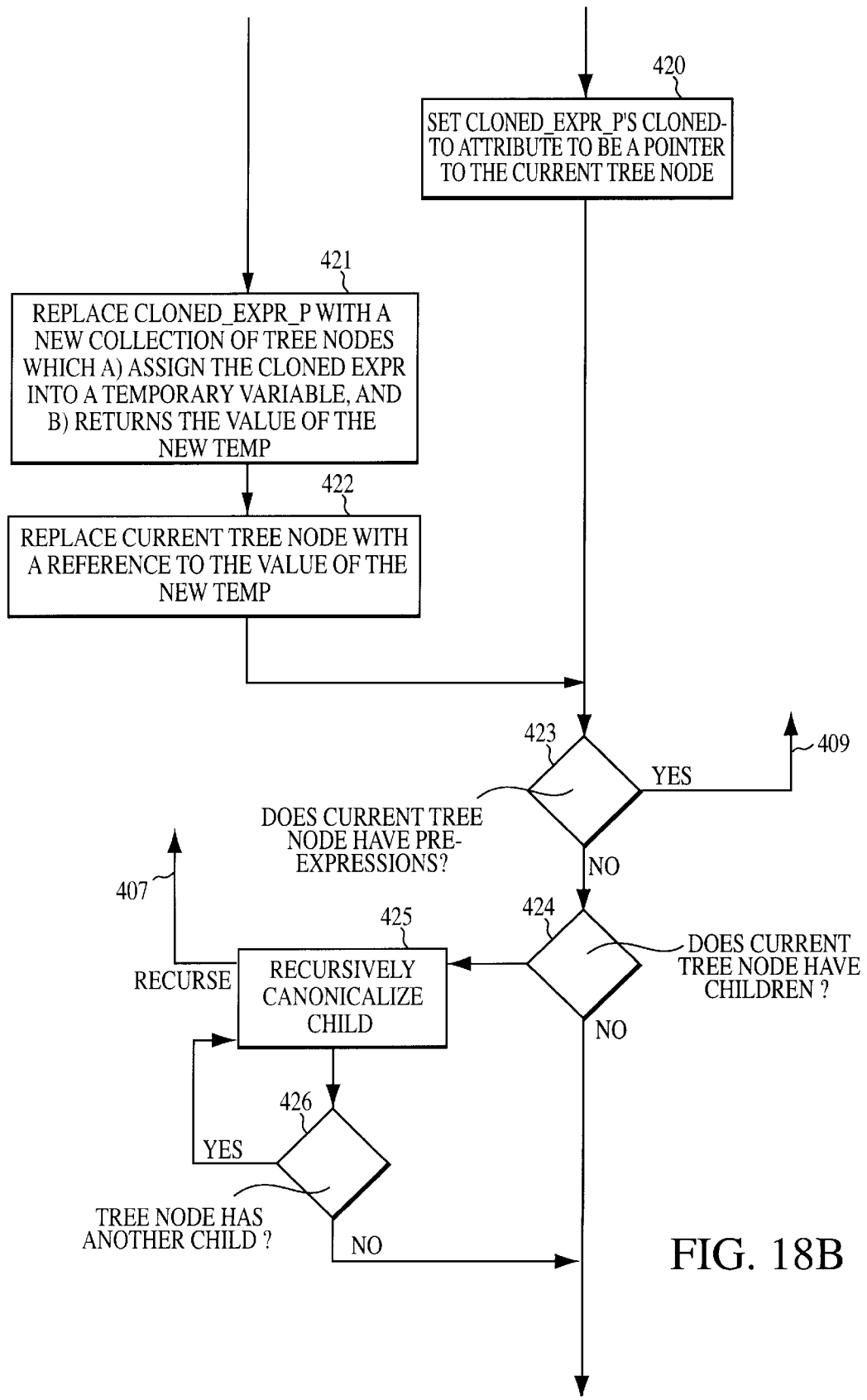
Figure 18C:
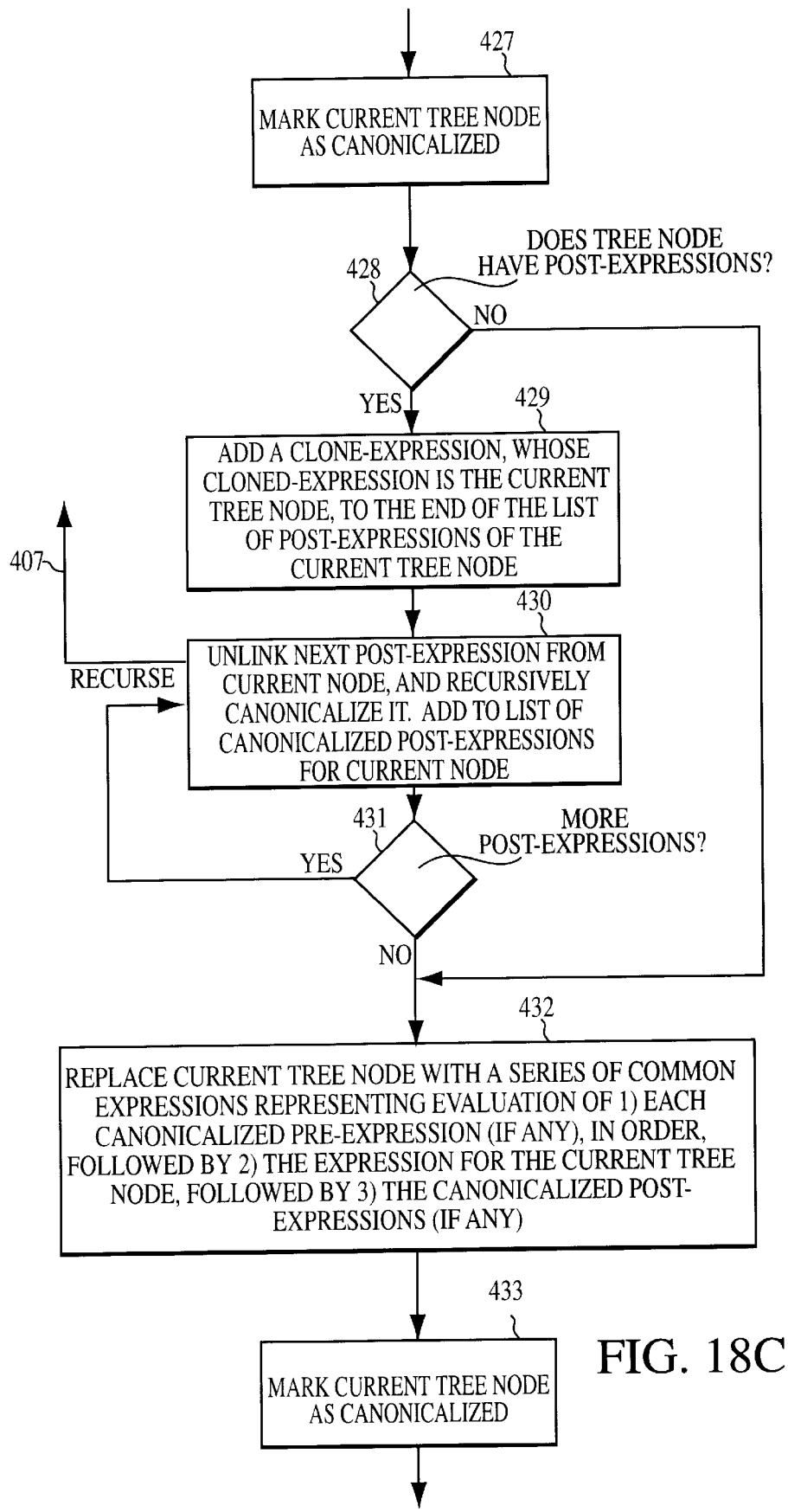
Figure 18D:
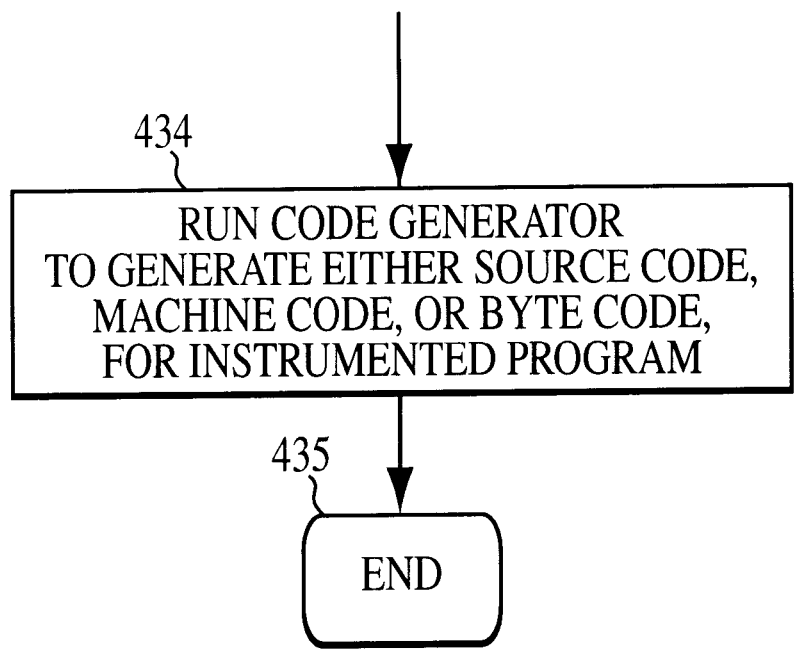

Steps 401–435 of FIGS. 18–18D illustrate the instrumentation technique in accordance with the invention. Note that Step 407 is really a summary description of steps 408 and 433, and is not an independent step. Also, the term "annotations" as used in FIGS. 18–18D refer to pre-expressions, post-expressions, or clone-expressions.

Additional Information

The following publications containing additional information pertaining to the present invention are hereby incorporated herein in their entirety by reference:

CenterLine Software, Inc. (10 Fawcett Street, Cambridge, Mass.), "C++ Expert User's Guide and Reference," 1996;

CenterLine Software, Inc., "Developing Quality C and C++ Applications with Centerline's C++ Expert: A CenterLine White Paper, 1996.

There have been described novel and improved apparatus and techniques for link-time and run-time error detection and program instrumentation. It is evident that those skilled in the art may now make numerous uses and modifications of and departures from the specific embodiment described herein without departing from the inventive concept.

Implementation of other aspects of the invention follow readily from knowledge of the basic invention. The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and to generate output information. The output information is applied to one or more output devices, in known fashion.

Each program is preferably implemented in a high-level procedural or object-oriented programming language to communicate with a computer system. However, che programs can be implemented in assembly or machine language, if desired. In any case, the language may be a compiled or interpreted language.

Each such computer program is preferably stored on a storage media or device (e.g., ROM or magnetic diskette) readable by a general or special-purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

What is claimed is:

1. A method for detection of errors in computer program code, comprising the steps of:

computing typeprints of data types contained in the computer program code, by combining a hash code corresponding to each data type with an is-partial bit that identifies whether the data type is specified only partially in the computer program code;

checking consistency of declarations of program entities contained in the computer program code, by performing comparisons of data types corresponding to common program entities contained in the computer program code in order to identify differing data types that improperly correspond to a common program entity; and exempting from consistency checking any data type whose typeprint has an is-partial bit, whereby false indications of inconsistency of partially specified data types are avoided.

2. A method for detection of errors in computer program code, comprising the steps of:

computing typeprints of data types, including at least a first data type and a second data type, contained in the computer program code, comprising the steps of:

computing a complete typeprint of the first data type by providing a hash code corresponding to the first data type;

computing an incomplete typeprint of the first data type by providing a hash code corresponding to the first data type that hashes less information than the hash code used for computation of the complete typeprint; and computing an incomplete typeprint of the second data type, without computing a complete typeprint of the second data type; and checking consistency of declarations of program entities contained in the computer program code, by performing comparisons of data types corresponding to common program entities contained in the computer program code in order to identify an error due to differing data types that improperly correspond to a common program entity;

the step of performing comparisons comprising the steps of:

whenever two data types having complete typeprints are compared, identifying the error if and only if the complete typeprints are not identical;

whenever two data types having incomplete typeprints but no complete typeprints are compared, identifying the error if and only if the incomplete typeprints are not identical;

whenever a data type having a complete typeprint and an incomplete typeprint is compared with a data type having an incomplete typeprint but no complete typeprint, identifying the error if and only if the incomplete typeprints are not identical.

3. A method for detection of errors in computer program code, comprising the steps of:

computing typeprints of data types contained in the computer program code, comprising the steps of:

computing a precise typeprint of each of the data types by providing a hash code corresponding to the data type;

computing a sloppy typeprint of each of the data types by providing a hash code corresponding to the data type, including computing a sloppy typeprint of at least one data type by providing a hash code that hashes less information than the hash code used for computation of the precise typeprint for the data type; and checking consistency of declarations of program entities contained in the computer program code, by performing comparisons of data types corresponding to common program entities contained in the computer program code in order to identify differing data types that improperly correspond to a common program entity;

the step of performing comparisons of data types comprising the step of comparing sloppy typeprints corresponding to common program entities in order to identify declaration inconsistencies of a serious nature and the step of comparing precise typeprints corresponding to common program entities in order to identify declaration inconsistencies of a milder nature.

4. The method of claim 1 wherein the computer program code is computer program source code.

5. The method of claim 2 wherein the computer program code is computer program source code.

6. The method of claim 3 wherein the computer program code is computer program source code.

* * * * *